(12) United States Patent
Fukuda

(10) Patent No.: US 8,826,111 B2
(45) Date of Patent: *Sep. 2, 2014

(54) RECEIVING APPARATUS AND METHOD FOR DISPLAY OF SEPARATELY CONTROLLABLE COMMAND OBJECTS, TO CREATE SUPERIMPOSED FINAL SCENES

(75) Inventor: Kazuhiro Fukuda, Kanagawa (JP)

(73) Assignee: Sony Corporation (JP)

( * ) Notice: Subject to any disclaimer, the term of this patent is extended or adjusted under 35 U.S.C. 154(b) by 593 days.

This patent is subject to a terminal disclaimer.

(21) Appl. No.: 12/768,201

(22) Filed: Apr. 27, 2010

(65) Prior Publication Data

US 2010/0201881 A1 Aug. 12, 2010

Related U.S. Application Data

(63) Continuation of application No. 09/523,437, filed on Mar. 10, 2000, now Pat. No. 7,757,157.

(30) Foreign Application Priority Data

Mar. 19, 1999 (JP) .................................. P11-076598

(51) Int. Cl.
*G06F 17/00* (2006.01)

(52) U.S. Cl.
USPC ........... 715/202; 715/201; 715/203; 715/204; 715/205; 715/760; 715/234; 715/235; 715/236; 715/237; 715/238; 715/239; 715/240; 715/241; 715/242; 715/243; 715/244; 715/245; 715/246; 715/247; 715/731; 715/732; 715/762; 715/763; 715/764; 715/715; 715/767

(58) Field of Classification Search
USPC ......... 715/760, 234–247, 731–732, 762–764, 715/201–205, 715, 767
See application file for complete search history.

(56) References Cited

U.S. PATENT DOCUMENTS

| 5,404,316 | A | | 4/1995 | Klingler et al. |
| 5,666,542 | A | | 9/1997 | Katai et al. |
| 5,682,326 | A | * | 10/1997 | Klingler et al. ............... 715/202 |
| 5,784,095 | A | | 7/1998 | Robbins et al. |
| 5,956,736 | A | | 9/1999 | Hanson et al. |

(Continued)

FOREIGN PATENT DOCUMENTS

EP 0 827 112 A 3/1998

OTHER PUBLICATIONS

Leidig T., et al: "Authoring MHEG presentations with GLASS-Studio" Multimedia Software Development, 1996. Proceedings., International Workshop on Berlin, Germany Mar. 25-26, 1996, Los Alamito, CA, USA, IEEE Comput. Soc, US, Mar. 25, 1996, pp. 150-158.

(Continued)

*Primary Examiner* — Quoc A Tran
(74) *Attorney, Agent, or Firm* — Lerner, David, Littenberg, Krumholz & Mentlik, LLP

(57) ABSTRACT

A receiving apparatus and method for display of final superimposed scenes from a receiver adapted to receive shared object control information used for forming final superimposed scenes and display final superimposed scenes. The final superimposed scenes are formed by superimposing two or more shared scenes each comprising one or more shared objects. The shared object comprises user-selectable command objects that are separately controllable independent of the shared scenes.

10 Claims, 23 Drawing Sheets

(56) References Cited

U.S. PATENT DOCUMENTS

| | | |
|---|---|---|
| 5,982,365 A | 11/1999 | Garcia et al. |
| 6,023,715 A | 2/2000 | Burkes et al. |
| 6,026,433 A | 2/2000 | D'Arlach et al. |
| 6,097,878 A | 8/2000 | Saib |
| 6,118,427 A * | 9/2000 | Buxton et al. ............ 345/629 |
| 6,199,082 B1 | 3/2001 | Ferrel et al. |
| 6,201,948 B1 | 3/2001 | Cook et al. |
| 6,282,547 B1 | 8/2001 | Hirsch |
| 6,301,586 B1 | 10/2001 | Yang et al. |
| 6,348,932 B1 | 2/2002 | Nishikawa et al. |
| 6,574,644 B2 | 6/2003 | Hsu et al. |
| 2003/0113096 A1 * | 6/2003 | Taira et al. ............ 386/46 |
| 2004/0179820 A1 * | 9/2004 | Kashiwagi et al. ............ 386/95 |

OTHER PUBLICATIONS

Vazirgiannis, M et al: "An Object-Oriented Model for Interactive Multimedia Presentations" Computer Journal, Oxford University Press, Surrey, GB, vol. 36, No. 1, 1993, pp. 78-86.

Seungtaek, Oh, et al: "Experiments with MHEG Player/Studio: an interactive hypermedia visualization and authoring system" Euromicro Conference, 1998. Proceedings 24th Vastera, Sweden Aug. 25-27, 1998, Los Alamitos, CA, USA, IEEE Comput. Soc, US, Aug. 25, 1998, pp. 610-615.

* cited by examiner

TIME-DIVISION MULTIPLEXING ON THE TRANSMITTER SIDE

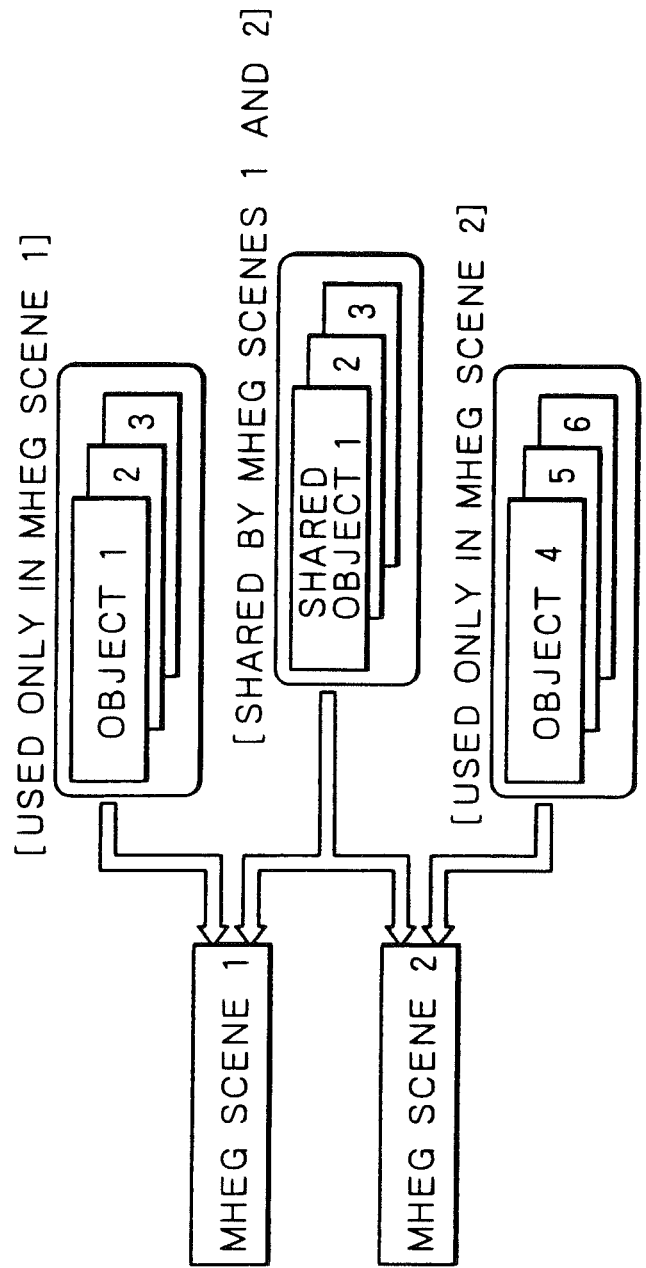
F I G. 15

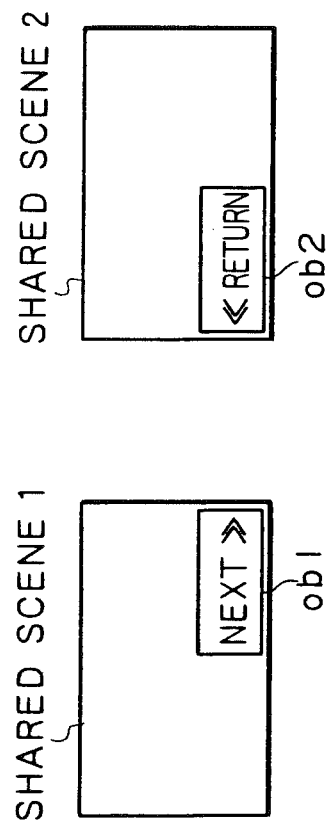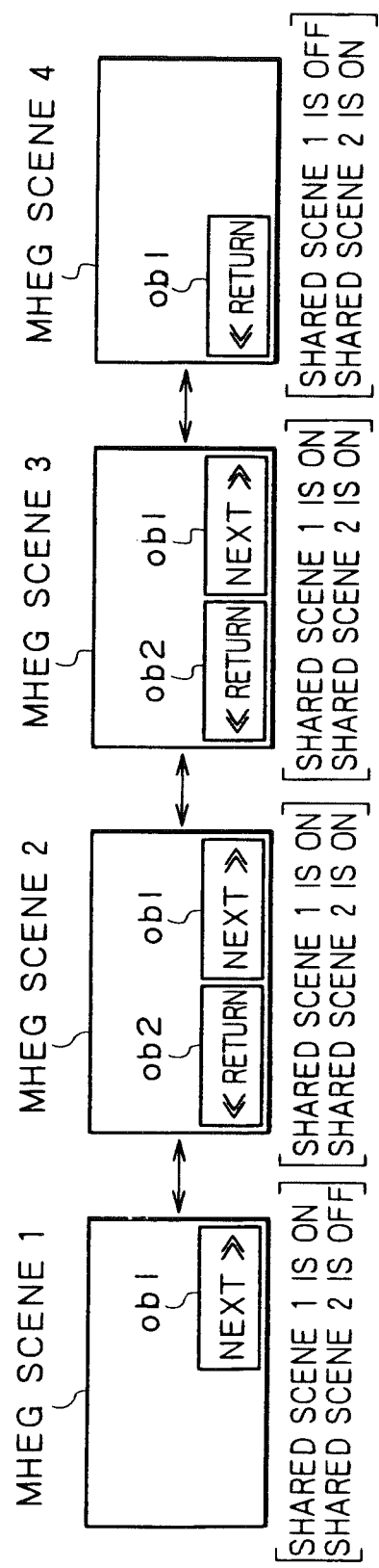

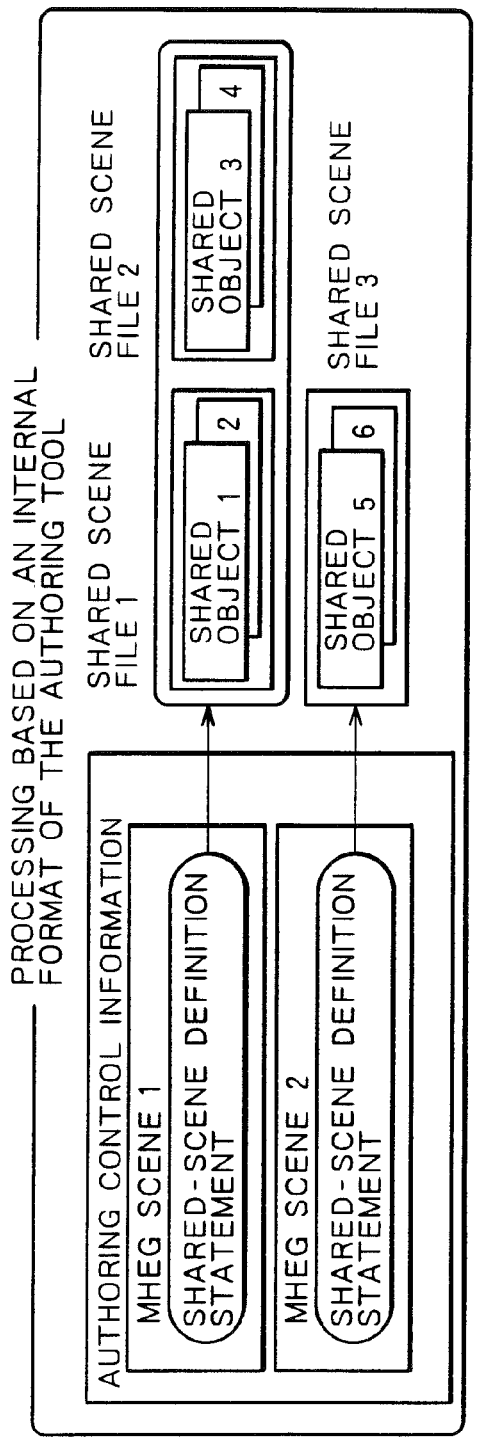
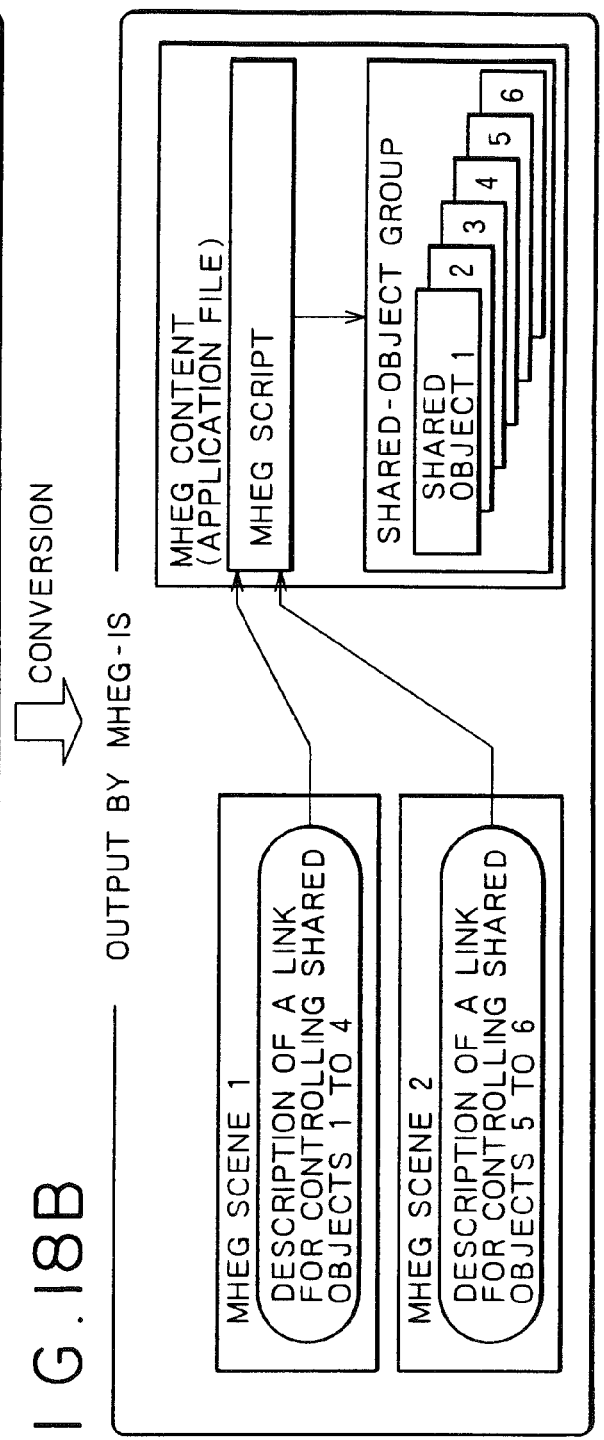
FIG. 18A
FIG. 18B

CREATION OF A SHARED SCENE

SETTING A SHARED SCENE FOR AN MHEG SCENE

RECEIVING APPARATUS AND METHOD FOR DISPLAY OF SEPARATELY CONTROLLABLE COMMAND OBJECTS, TO CREATE SUPERIMPOSED FINAL SCENES

CROSS-REFERENCE TO RELATED APPLICATIONS

This application is a continuation of U.S. application Ser. No. 09/523,437, filed on Mar. 10, 2000, now U.S. Pat. No. 7,757,157, which claims priority from Japanese Application No. JP 11-076598, filed Mar. 19, 1999, the disclosures of which is are incorporated herein by reference.

BACKGROUND OF THE INVENTION

The present invention relates to an information processing apparatus used as the so-called authoring tool for creating broadcast contents such as MHEG (Multimedia Hypermedia Information Coding Expert Group) contents to be broadcasted along with video information.

In recent years, digital satellite broadcasting has become popular. In comparison with the contemporary analog broadcasting, for example, digital satellite broadcasting is better at preventing noise and fading, hence, is capable of transmitting a signal with a high quality. In addition, the frequency utilization rate is improved and a multi-channel transmission can also be embraced. To put it concretely, in the case of digital satellite broadcasting, several hundreds of channels can be preserved by using one satellite. In such digital satellite broadcasting, it is possible to provide a number of special channels such as channels for sports, movies, music and news. Programs for special plans and contents of the channels are broadcasted through their respective channels.

By utilizing such a digital broadcasting system, the user is capable of downloading musical data such as a piece of music. There also has been proposed a system, called television shopping, that allows the user to make a purchasing contract to buy some products while watching a broadcast screen. That is to say, the digital satellite broadcasting system broadcasts additional data services at the same time as an ordinary broadcast program.

In the case of an operation to download musical data, for example, the broadcasting station broadcasts the musical data by multiplexing the data so as to synchronize the data with a broadcast program or video information. In addition, the user is capable of carrying out downloading operations interactively while watching a displayed GUI (Graphical User Interface) screen which serves as a downloading operation screen. Data for displaying such a GUI screen is also broadcasted by multiplexing.

Then, the user owning a reception apparatus selects a desired channel to display a GUI screen for downloading musical data by carrying out a predetermined operation on the reception apparatus. The user then carries out an operation on the GUI screen typically to supply the musical data to a digital audio apparatus connected to the reception apparatus. Typically, the musical data is recorded in the digital audio apparatus.

Incidentally, with regard to a GUI screen for downloading musical data described above, partial picture data and text data which are used as elements to form the GUI screen and unit data (or files) such as audio data to be output as a sound in accordance with a predetermined operation are each handled as an object. The output format of an object is controlled by a scenario description according to a predetermined system. That is to say, by broadcasting the so-called multimedia contents, a GUI screen described above is implemented.

It should be noted that a GUI screen for implementing a function to achieve a certain objective by prescription of described information is referred to as a "scene". A scene also includes an output such as a sound. An "object" is defined as unit information such as a picture, a sound or a text with an output format thereof prescribed on the basis of described information. In addition, during transmission, a data file of described information itself is also handled as one of the objects.

For example, as a system to prescribe a description of a content for broadcasting a GUI screen like the one described above, adoption of an MHEG system is conceivable.

In an MHEG prescription, one MHEG content or one MHEG application file typically comprises one or more scenes. A script is described to prescribe transitions between scenes and outputs which are synchronized with typically broadcast pictures of the scenes. In addition, a scene is controlled by a description of a script so that one or more objects of the scene are displayed in a predetermined display format.

In the broadcasting station, the MHEG content described above is created in accordance with broadcast contents by using typically a personal computer. On the personal computer, application software used as the script creation tool or an authoring tool is activated. Such application software is referred to hereafter as an MHEG authoring tool, a generic name given to the software.

Editing work is carried out typically in scene units by using the MHEG authoring tool described above. In general, objects to be displayed for a scene are selected and the editor writes a description of a scenario so as to display the selected objects in desired display formats in the scene. As an alternative, a GUI screen is used as the authoring tool to create a scene and editing results are described as a script.

Incidentally, a concept known as a shared object is prescribed in an MHEG application.

A shared object is a file used as an object which is shared among scenes.

With the contemporary MHEG authoring tool, however, there is provided only a function of merely selecting whether to use or not use a shared object for an MHEG application unit. To put it in detail, it is possible only to select an option to display or not to display a shared object as an object common to all scenes comprising an MHEG application.

Consider an attempt to effectively utilize a shared object. In this case, it is desirable to set any arbitrary shared object to be used or not to be used in each of scenes comprising an MHEG application.

If any arbitrary shared object is to be assigned to a scene instead of being assigned to an MHEG application, the option of using or the option of not using a shared object in a scene must be set by using typically a description of an action to turn on or off individual objects created for the object.

In order to set the option by using a description of such a script, it is necessary for the editor to sufficiently understand the description language. Thus, setting the option is a difficult job for the editor. In the end, it is quite within the bounds of possibility that the editor writes an incorrect description. For this reason, almost no editors use such a description to assign any arbitrary shared object to a scene in place of an MHEG application.

In consequence, shared objects are not utilized effectively in the present state of the art. As a result, there are hindrances to diversification of display formats of MHEG contents.

SUMMARY OF THE INVENTION

It is therefore an object of the present invention to address the problems described above by providing effective utilization of a shared object so as to allow the shared object to be handled with ease typically in creation of MHEG contents.

In accordance with an aspect of the present invention, there is provided an information processing apparatus for creating content information according to a predetermined specification wherein the content information includes a scene having an object for creating the content information and at least control information for controlling an output format of a scene or an object. The content information defines a shared object which can be shared among a plurality of scenes. The information processing apparatus includes a shared-scene definer operable to define a shared scene as an editing material processible in the information processing apparatus where a shared scene is a virtual scene usable as a scene common to a plurality of scenes, a shared-scene creator operable to create the shared scene by using any arbitrary objects in accordance with a definition generated by the shared-scene definer, a shared-scene settor operable to set a specific shared scene to be used for each of the scenes forming the content information wherein the specific shared scene is selected among shared scenes created by the shared-scene creator, a shared-object settor operable to set an object used in the specific shared scene as a shared object and a control-information describer operable to describe control information for controlling a state of utilization of shared objects in each of the scenes in accordance with the predetermined specification and in dependence on a result of setting the specific shared scene carried out by the shared-scene setting means.

According to the configuration described above, the information processing apparatus functions as an authoring tool for creating content information conforming to a predetermined specification and defines a shared scene which is a virtual scene using a shared object usable as an object common to scenes. During scene editing, an edit operation to set a shared scene to be used for scenes is carried out to allow an object shared by a plurality of scenes to be handled.

Then, after an object used in a shared scene has been set as a shared object, control information for controlling a utilization state of a shared object to be used for scenes in accordance with results of setting the shared scene for each scene is described in a format conforming to the predetermined specification described above.

BRIEF DESCRIPTION OF THE DRAWINGS

FIG. 15 is an explanatory diagram showing the concept of a shared object in an MHEG content;

FIGS. 16A to 16F are explanatory diagrams showing an example of scene editing using shared scenes;

FIGS. 18A and 18B are explanatory diagrams showing the concept of processing embraced by an MHEG authoring tool provided by the embodiment;

DETAILED DESCRIPTION OF THE PREFERRED EMBODIMENT

The present invention will become more apparent from a careful study of the following detailed description of a preferred embodiment with reference to accompanying diagrams.

An information processing apparatus provided by the present invention is used in a system which allows a program to be broadcasted by means of digital satellite broadcasting and information such as musical data or audio data related to the program to be downloaded on the receiver side.

To be more specific, the information processing apparatus provided by the present invention is an authoring system for creating contents used by the broadcasting station as GUI data for typically a downloading operation screen as data appended or synchronized to a program (or video information) using digital satellite broadcasting.

In addition, an authoring system implemented by this embodiment is a system for creating MHEG contents.

It should be noted that the description is given hereafter in the following order:
1 Digital Satellite Broadcasting System
1-1 Overall Configuration
1-2 Operations for a GUI Screen
1-3 Ground Station
1-4 Transmission Format
1-5 IRD 2 Authoring System
2-1 Structure of an MHEG Content
2-2 Concept of a Shared Scene
2-3 Configuration of the MHEG Authoring System
2-4 Typical GUI Screens Displayed as Part of MHEG Authoring Software
2-5 Processing Operations
1 Digital Satellite Broadcasting System
1-1 Overall Configuration First of all, before explaining an MHEG authoring system implemented by this embodiment, a digital satellite broadcasting system using MHEG contents created by using this MHEG authoring system is explained.

Figure 1:
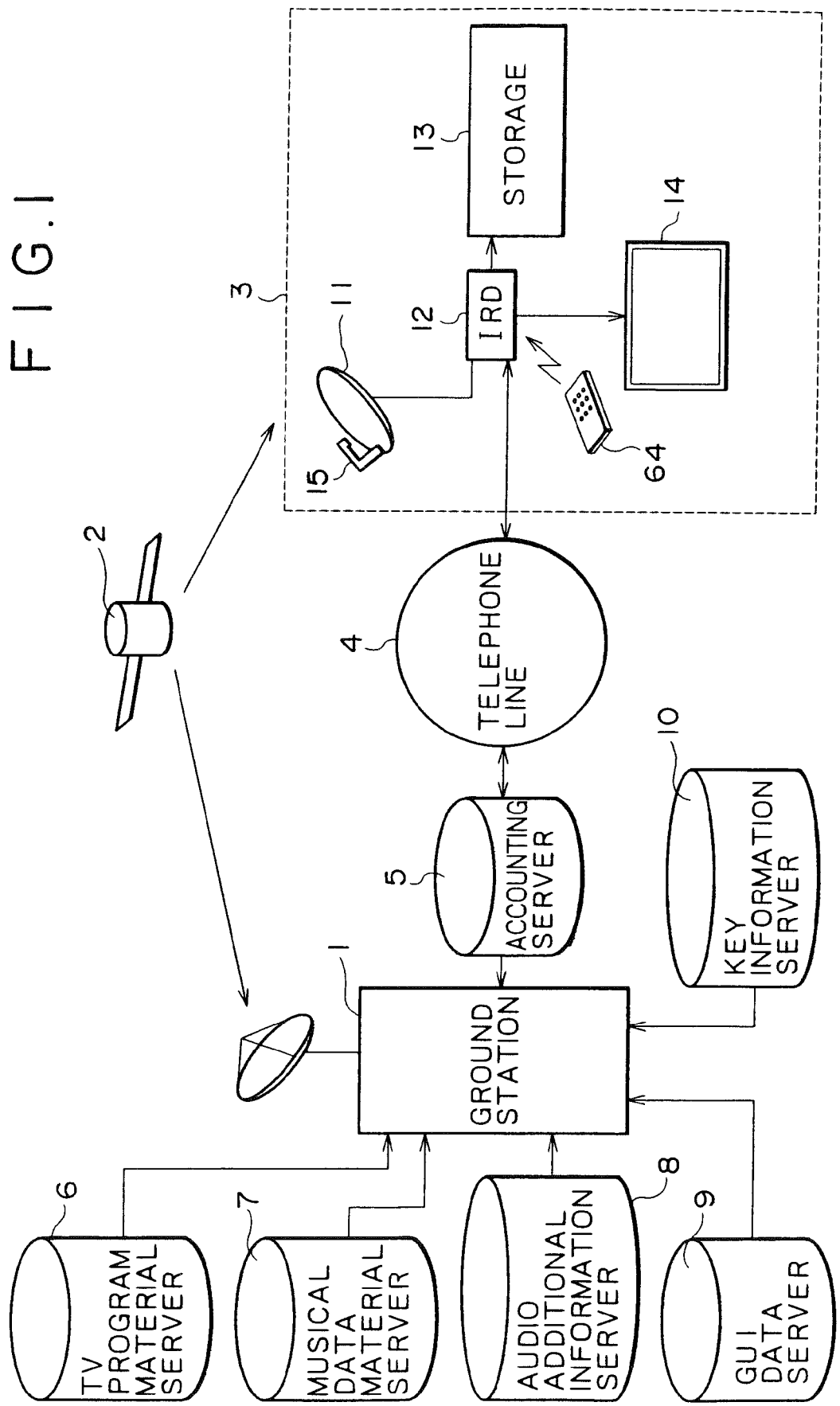
FIG. 1 is a block diagram showing a typical configuration of a digital satellite broadcasting/reception system implemented by an embodiment of the present invention.

FIG. 1 is a block diagram showing the overall configuration of the digital satellite broadcasting system implemented by this embodiment. As shown in the figure, a ground station 1 in the digital satellite broadcasting system receives material for television program broadcasting from a television program material server 6, musical data from a musical data material server 7, audio additional information from an audio additional information server 8 and GUI data from a GUI data server 9.

The television program material server 6 is a server for providing material of an ordinary broadcast program. A musical broadcast transmitted by the television program material server 6 includes moving pictures and sounds. In the case of a musical broadcasting program, for example, a material of moving pictures and sounds broadcasted by the television program material server 6 are used as moving pictures and sounds typically for promotion of new songs.

The musical data material server 7 is a server for providing an audio program by using an audio channel. The material of an audio program is limited to sounds. The musical data material server 7 transmits materials of audio programs by way of a plurality of audio channels.

In program broadcasting through audio channels, a particular piece of music is broadcasted repeatedly at unit time intervals. Audio channels are independent of each other. A variety of ways to use the audio channels is conceivable. For example, an audio channel is used for broadcasting a number of most recent Japanese pop songs repeatedly at fixed intervals while another audio channel is used for broadcasting a number of most recent foreign pop songs repeatedly at fixed intervals.

The audio additional information server 8 is a server for providing information on timing of music provided by the musical data material server 7.

The GUI data server 9 provides GUI data (or broadcasting content data) for forming a GUI screen used in conjunction with operations carried out by the user. In the case of formation of a GUI screen for downloading music as will be described later, for example, the GUI data server 9 provides, among other information, picture data and text data used for creating a list page and an information page of pieces of music transmitted from the GUI data server 9 and data for creating a still picture of an album jacket. In addition, the GUI data server 9 also provides EPG (Electrical Program Guide) data used for displaying a program in a reception facility 3.

It should be noted that GUI data conforms to typically the MHEG (Multimedia Hypermedia Information Coding Experts Group) system. The MHEG system is an international standard of scenario description for creation of a GUI screen. According to the MHEG system, multimedia information, procedures, operations and their combination are each taken as an object and, after each object has been coded, a title (such as a GUI screen) is created. In the case of this embodiment, the MHEG-5 system is adopted.

The ground station 1 transmits pieces of information received from the television program material server 6, the musical data material server 7, the audio additional information server 8 and the GUI data server 9 by multiplexing the pieces of information with each other.

In this embodiment, video data and audio data received from the television program material server 6 have been subjected to a compression encoding process according to the MPEG2 (Moving Picture Experts Group 2) system and the MPEG2 audio system respectively. On the other hand, audio data received from the musical data material server 7 has been subjected to a compression encoding process according to typically either the MPEG2 audio system or the ATRAC (Adoptive Transform Acoustic Coding) system depending on the audio channel.

In the multiplexing process of the pieces of data in the ground station 1, the data is encrypted by using a key received from a key information server 10.

It should be noted that a typical internal configuration of the ground station 1 will be described later.

A signal transmitted by the ground station 1 by way of a satellite 2 is received by the reception facility 3 of every home. The satellite 2 includes a plurality of transponders mounted thereon. A transponder has a typical transmission power of 30 Mbps. The reception facility 3 installed in a home comprises a parabola antenna 11, an IRD (Integrated Receiver Decoder) 12, a storage device 13 and a monitor unit 14.

A remote controller 64 shown in the figure is used to remotely operate the IRD 12.

The parabola antenna 11 receives a signal transmitted by the ground station 1 by way of the satellite 2. The received signal is converted into a signal having a predetermined frequency by an LNB (Low Noise Block Down Converter) 15 installed on the parabola antenna 11. The signal generated by the LNB 15 is supplied to the IRD 12.

General operations carried out by the IRD 12 include selection of a signal transmitted as a predetermined audio signal among signals received by the parabola antenna 11 and demodulation of the selected signal to extract video data and audio data as a program and output the video and audio data as video and audio signals respectively. The IRD 12 also outputs a GUI screen based on GUI data received as multiplexed data in a program. The monitor unit 14 displays a picture of a program and outputs sounds of the program which have been selected by the IRD 12. In addition, the monitor unit 14 is also capable of displaying a GUI screen in accordance with an operation carried out by the user as will be described later.

The storage device 13 is used for storing audio data (or musical data) downloaded by the IRD 12. Not specially limited to a particular storage type, the storage device 13 can be implemented by an MD (Mini Disc) recorder/player, a DAT recorder/player and a DVD recorder/player. In addition, the storage device 13 can also be implemented by a personal computer, which is capable of storing audio data in recordable media such as the representative CD-ROM, besides a hard disc.

Figure 2:
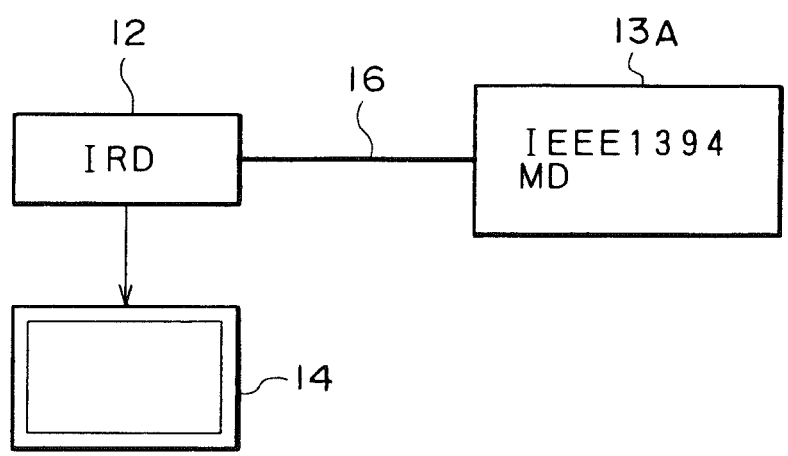
FIG. 2 is a block diagram showing a typical configuration of a reception facility provided by the embodiment.

Furthermore, the reception facility 3 provided by this embodiment may also employ an MD recorder/player 13A (FIG. 2) as the storage device 13 shown in FIG. 1. As shown in FIG. 2, the MD recorder/player 13A has a data interface conforming to IEEE1394 data transmission specifications.

The IEEE1394 MD recorder/player 13A shown in FIG. 2 is connected to the IRD 12 by an IEEE1394 bus 16. Thus, audio data such as music received by the IRD 12 in this embodiment, that is, downloaded data, can be recorded directly with its compressed/encoded state of the ATRAC system sustained as it is. In addition, with the IEEE1394 MD recorder/player 13A connected to the IRD 12 by an IEEE1394 bus 16, it is also possible to record jacket data (or still-picture data) of the album and text data such as lyrics besides the audio data.

The IRD 12 is capable of communicating with an accounting server 5 through typically a telephone line 4. An IC card for recording various kinds of information as will be described later is inserted into the IRD 12. When audio data of music is downloaded, for example, history information on the audio data is recorded onto the IC card. The history information recorded on the IC card is transmitted to the accounting server 5 at predetermined times and with predetermined timing by way of the telephone line 4. The accounting server 5 carries out charging by setting a transmission fee according to the history information received from the IRD 12. The transmission fee is then charged to the user.

The ground station 1 transmits video and audio data used as a material of a musical program broadcast from the television program material server 6, audio data used as a material of the audio channel from the musical data material server 7, audio data from the audio additional information server 8 and GUI data from the GUI data server 9 by multiplexing the pieces of data with each other.

Then, when this broadcast is received by the reception facility 3 of a home, a program of a selected channel can be watched typically on a monitor unit 14. In addition, an EPG (Electrical Program Guide) screen is displayed as a GUI Screen to allow the user to search the screen for a program. In the second place, by carrying out necessary operations for an EPG screen for a special service the user is capable of receiving a service other than ordinary programs presented by the broadcasting system to the user.

By carrying out an operation for a displayed GUI screen for providing a service of downloading audio (or musical) data, for example, the user is capable of downloading the audio data of a desired piece of music and storing and keeping the data in the storage device 13.

It should be noted that this embodiment exhibits interactivity in a data service broadcasting system for rendering special services other than the ordinary program broadcasts given in response to operations carried out for a GUI screen like the one described above. Such an interactive data service broadcasting system is called an interactive broadcasting system.

1-2 Operations for a GUI Screen

Figure 3:
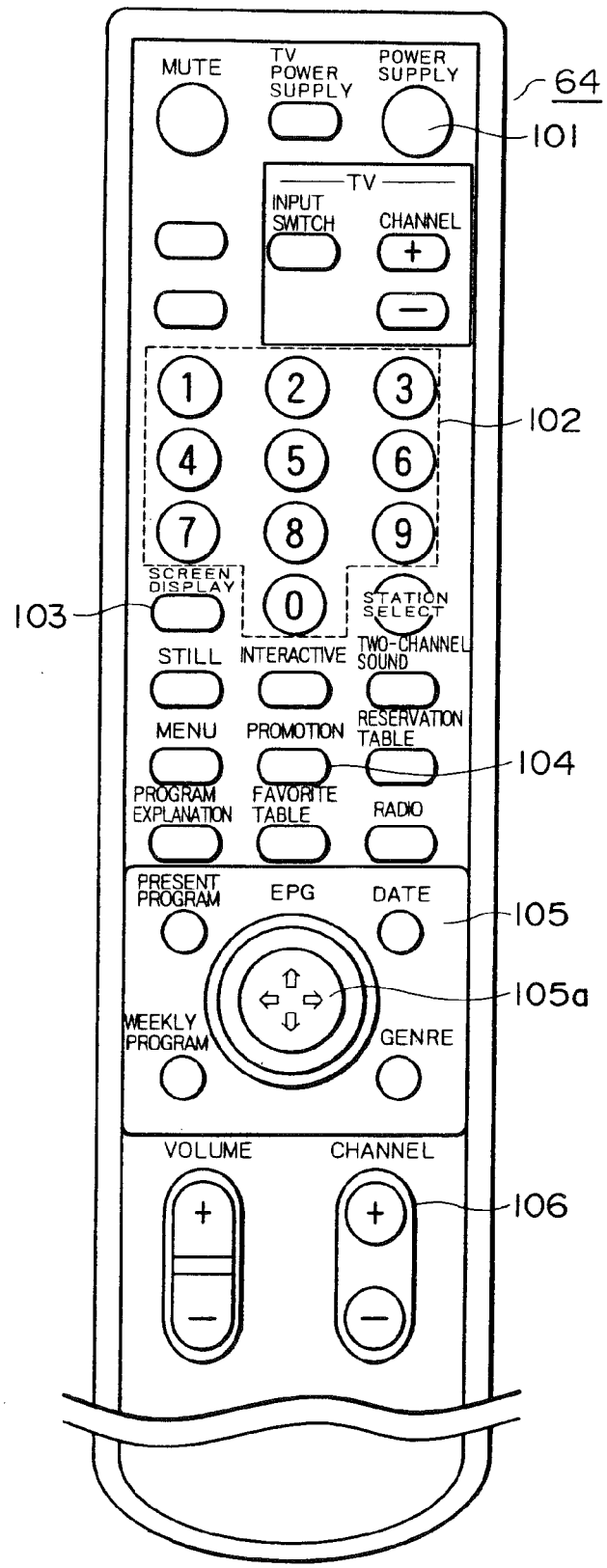
FIG. 3 is a front-view diagram showing the external appearance of a remote controller for remotely operating an IRD.

The following description briefly explains an example of the interactive broadcasting system and typical operations to be carried out for a GUI screen, with reference to FIGS. 3 and 4. In particular, downloading of musical data (or audio data) is explained.

The description begins with an explanation of operation keys on a remote controller 64 for use by the user to remotely carry out an operation on the IRD 12 with reference to FIG. 3. Specifically, main keys are explained.

FIG. 3 is a diagram showing an operation panel surface of the remote controller 64. On the panel surface, a variety of switches are laid out. The keys include a power-supply key 101, numeric keys 102, a screen display switching key 103, an interactive switching key 104, an EPG key panel unit 105 and a channel key 106 to be explained as follows.

The power-supply key 101 is operated to turn the power supply of the IRD 12 on and off. A numeric key 102 is operated to specify a channel or enter a digit of a number to typically a GUI screen when a numeric input is required.

The screen display switching key 103 is operated typically for switching the monitor display from an ordinary broadcast screen to an EPG screen and vice versa. Assume that an EPG screen is called by operating the screen display switching key 103. With the EPG screen displayed, a key provided on the EPG key panel unit 105 is operated to search the EPG screen for a program using a display screen of an electronic program guide. An arrow key 105a provided in the EPG key panel unit 105 can be operated also for moving a cursor on the GUI screen for rendering services to be described later.

The interactive switching key 104 is operated for switching the monitor display from an ordinary broadcast screen to an GUI screen for rendering a service appended to a broadcast program and vice versa.

The channel key 106 is operated to increase or decrease the number of a channel selected by the IRD 12.

It should be noted that the remote controller 64 provided in this embodiment has a configuration that allows a variety of operations to be carried out against the monitor unit 14 and includes a variety of keys for the operations. However, description of the keys to be operated for the monitor unit 14 is omitted.

Figure 4A:
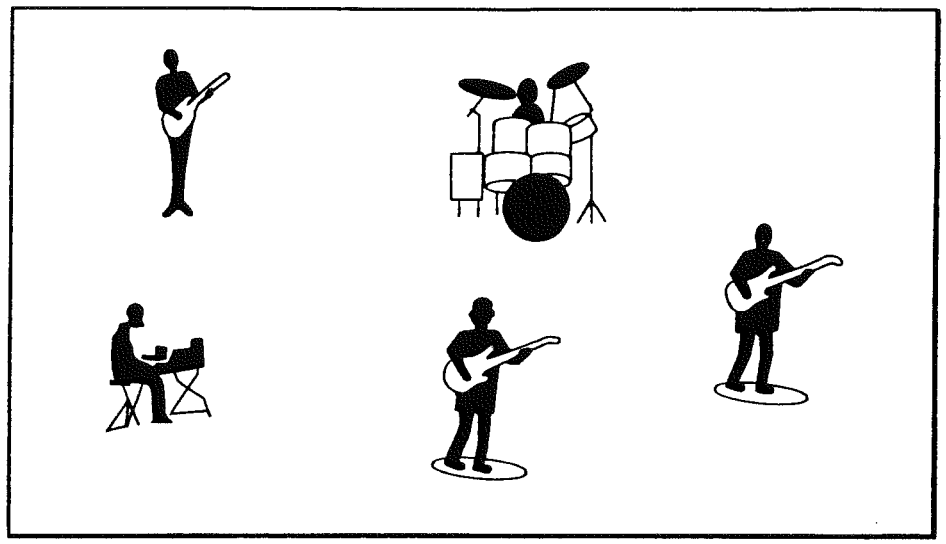
FIGS. 4A and 4B are explanatory diagrams showing switching from a broadcast screen to a GUI screen and vice versa.
Figure 4B:
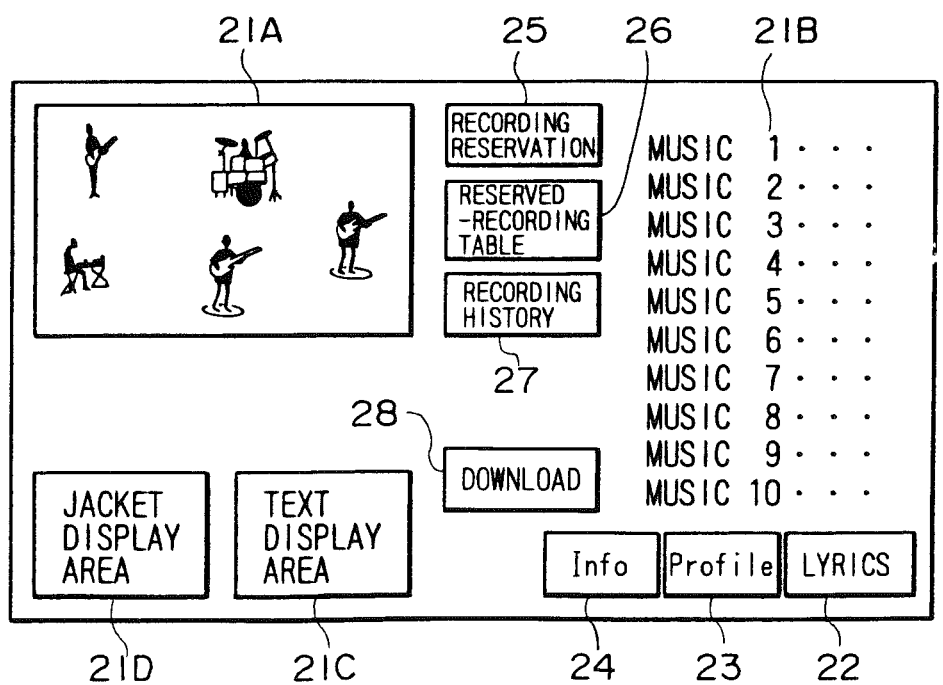

Next, an example of operations carried out for a GUI screen is explained by referring to FIGS. 4A and 4B.

When a broadcast is received by the reception facility 3 and a desired channel is selected, a display screen like one shown in FIG. 4A appears on the monitor unit 14. As shown in the figure, the screen displays a moving picture based on program material received from the television program material server 6. That is to say, the contents of an ordinary program are displayed. In this example, a musical program is displayed. In addition, appended to this musical program is an interactive broadcast to render a service of downloading audio data of music.

With the musical program displayed on the screen, assume for example that the user operates the interactive switching key 104 of the remote controller 64. In this case, the monitor display is switched to a GUI screen like one shown in FIG. 4B for downloading audio data.

In the first place, in a television program display area 21A on the left top corner of this GUI screen, a reduced picture of video data of FIG. 4A received from the television program material server 6 is displayed.

In addition, on the right top corner of the GUI screen, a list 21B of pieces of channel music broadcasted through audio channels is displayed. The left bottom corner of the GUI screen is allocated as a text display area 21C and a jacket display area 21D. On the right side of the GUI screen, a lyrics display button 22, a profile display button 23, an information display button 24, a reservation-recording button 25, a completed-reservation-table display button 26, a recording-history-display button 27 and a download button 28 are displayed.

While looking at the names of the pieces of music on the list 21B, the user searches the list 21B for a piece of music which the user is interested in. If the user finds a piece of music of interest, the user moves the cursor to the display position of the piece of music of interest using the arrow key 105a and carries out an enter operation typically by pressing the center position of the arrow key 105a. Such an operation, including moving the cursor to a displayed position and carrying out an enter operation, is hereafter referred to simply as an operation to press the button or pressing the button.

By doing so, the user is capable of listening to the piece of music indicated by the cursor on a trial basis. Since the same music is broadcasted repeatedly during a predetermined unit period of time through any audio channel, it is possible to output the sound of the music of an audio channel selected by operating the IRD 12 and to listen to the selected music by switching the monitor display from an original screen to the GUI screen with the original screen kept in the television program area 21A as it is. At that time, the still picture of the CD jacket of the selected music is also displayed on the jacket display area 21D as well.

In addition, if the user presses the lyrics display button 22, the lyrics of the selected music are displayed in the text display area 21C with timing synchronized to the audio data. By the same token, if the profile display button 23 is pressed, the profile of an artist for the music is displayed in the text display area 21C. Likewise, if the information display button 24 is pressed, information on the music such as a concert for the music is displayed on the text display area 21C. In this way, the user is capable of knowing what music is broadcasted at the present time and, furthermore, detailed information on each of the pieces of music.

When the user wants to buy the piece of music of interest to the user, the user presses the download button 28. As the download button 28 is pressed, the audio data of the selected music is downloaded and stored in the storage device 13. It is also possible to download other information such as the lyrics, the profile of the artist and the still picture of the jacket along with the audio data of the music.

Each time the audio data of music is downloaded in this way, its history information is stored in an IC card inserted into the IRD 12. Information stored in the IC card is transmitted to the accounting server 5 typically once a month to be used for computing a fee for data services rendered to the user. In this way, the copyright for the downloaded music can be protected.

When the user wants to make an advance reservation for downloading, the user presses the reservation recording button 25. As the reservation recording button 25 is pressed, the monitor display is switched from the GUI screen to a screen fully used for displaying a list of all pieces of music which can be reserved. The list comprises pieces of music obtained as a result of a search operation carried out typically at hourly or weekly intervals and for each channel. The user then selects a piece of music to be subjected to reserved downloading from the list. Its related information is stored in the IRD 12. When the user wants to confirm a piece of music already subjected to reserved downloading, the user presses the completed-reservation-table display button 26 to use the entire screen for displaying a table of pieces of music already subjected to reserved downloading. A piece of music subjected to reserved downloading as described above is downloaded to the IRD 12 and stored in the storage device 13 at a reserved time.

The user is also capable of confirming a piece of music already downloaded. In this case the user presses the recording history button 27 to use the entire screen for displaying a list of already downloaded pieces of music.

As described above, in the reception facility 3 of the system to which the present invention is applied, a list of pieces of music is displayed on the GUI screen of the monitor unit 14. Then, by selecting a piece of music from the list displayed on the GUI screen, the user is capable of listening to the selected music and viewing the lyrics and the profile of the artist of the music on a trial basis. The user is also capable of displaying a history of reserved downloading showing a list of pieces of music to be downloaded and a list of pieces of music already downloaded.

A change may be made to the display on a GUI screen and a sound output may be programmed in response to an operation carried out by the user for the GUI screen. Such changes or modifications are implemented by prescribing a relation among objects through a scenario based on the MHEG system described earlier. In this case, an object is picture data serving as parts corresponding to the buttons or material data displayed in the display areas displayed in FIG. 4B.

In addition, in this specification, a scene is an environment in which a format to output information to achieve a certain purpose such as the display of a picture or an operation to output a sound is implemented by prescription of a relation among objects through description of a scenario. A file containing the description of a scenario itself is also handled as one of the objects forming a scene.

As described above, in a digital satellite broadcasting system to which the present invention is applied, a broadcast program is distributed by communication. In addition, audio data of music is also broadcasted through a plurality of audio channels. The user is allowed to search a list of distributed pieces of music for a desired one and to store the audio data of the desired music in the storage device 13 with ease.

It should be noted that a variety of conceivable implementations of services other than the service of providing programs in the digital satellite broadcasting system are not limited to the service of downloading of musical data described above. As a conceivable example of such implementation, there is provided the so-called television shopping whereby a products-introducing program is broadcasted and a GUI screen is used to make a purchasing contract.

1-3 Ground Station

An overview of the digital satellite broadcasting system implemented by an embodiment of the present invention has been described so far. The following description explains the system in more detail. The description begins with an explanation of the configuration of the ground station 1 with reference to FIG. 5.

The explanation given thereafter is based on the following assumption.

In the transmission of data from the ground station 1 to the reception facility 3 by way of the satellite 2 in this embodiment, a DSM-CC (Digital Storage Media-Command and Control) protocol is adopted.

As is already known, the DSM-CC (MPEG-part 6) system prescribes commands or a control system for retrieving an MPEG-encoded bit stream stored in DSM (Digital Storage Media) or storing such a stream in the DSM typically by way of some networks. In this embodiment, the DSM-CC system is adopted as a transmission standard in the digital satellite broadcasting system.

In order to transmit a content (that is, a set of objects) of a data broadcasting service such as a GUI screen in accordance with the DSM-CC system, it is necessary to define the description format of the content. In this embodiment, for definition of this description format, the MHEG system explained earlier is embraced.

Figure 5:
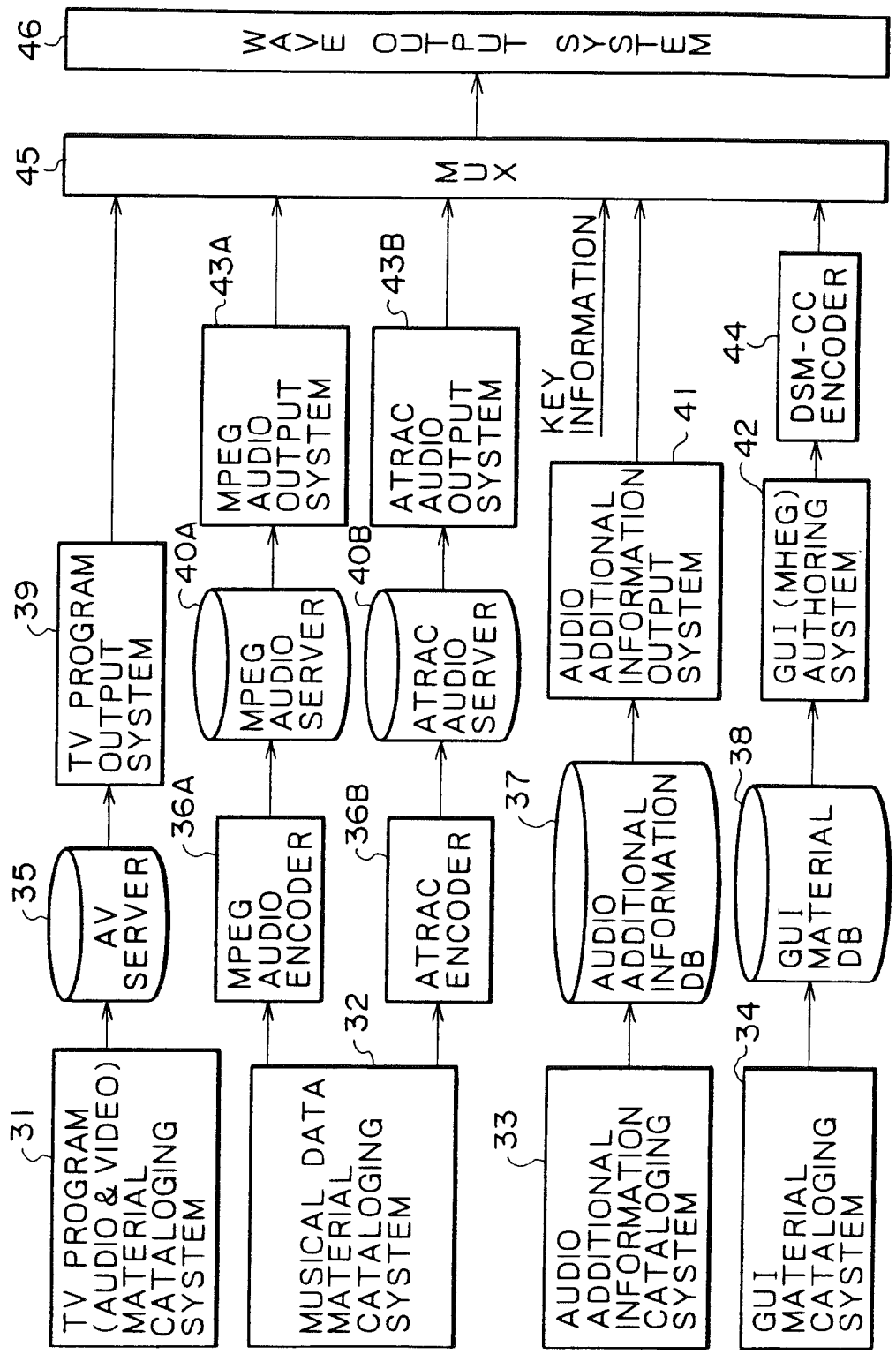
FIG. 5 is a block diagram showing a typical configuration of a ground station.

In the configuration of the ground station 1 shown in FIG. 5, a television program material cataloging system 31 catalogs material data obtained from the television program material server 6 in an AV server 35. The material data is supplied to a television program output system 39 in which video data is compressed in accordance with typically the MPEG2 system while audio data is converted into packets conforming to typically the MPEG2 audio system. Data output by the television program output system 39 is supplied to a multiplexer 45.

A musical data material cataloging system 32 receives material data, or audio data, from the musical data material server 7 and supplies the material data, to an MPEG2 audio encoder 36A and an ATRAC audio encoder 36B. In the MPEG audio encoder 36A, the audio data is subjected to an encoding process or, to be more specific, a compression-encoding process, before being cataloged in an MPEG audio server 40A. By the same token, in the ATRAC audio encoder 36B, the audio data is subjected to an encoding process or, to be more specific, a compression-encoding process, before being cataloged in an ATRAC audio server 40B.

The MPEG audio data cataloged in the MPEG audio server 40A is then supplied to an MPEG audio output system 43A to be converted into packets before being supplied to the multiplexer 45. Likewise, the ATRAC audio data cataloged in the ATRAC audio server 40B is then supplied to an ATRAC audio output system 43B as quadruple-speed ATRAC data to be converted into packets before being supplied to the multiplexer 45.

An audio additional information cataloging system 33 catalogs material data, that is, audio additional information, received from the audio additional information server 8 into an audio additional information data base 37. The audio additional information cataloged in the audio additional information data base 37 is then supplied to an audio additional information output system 41 to be converted into packets before being supplied to the multiplexer 45.

A GUI material cataloging system 34 catalogs material data, that is, GUI data, received from the GUI data server 9 into a GUI material data base 38.

The GUI material data cataloged in the GUI material data base 38 is then supplied to a GUI authoring system 42 for carrying out processing to convert the GUI material data into data of a format that can be output as a GUI screen, such as the scene described earlier in FIGS. 4A and 4B.

That is to say, if the scene is a GUI screen for downloading music, for example, data supplied to the GUI authoring system 42 is still picture data of an album jacket, text data of lyrics or the like or sound data to be output in accordance with an operation.

The pieces of data cited above are called monomedia data. In the GUI authoring system 42, an MHEG authoring tool is used to encode the pieces of monomedia data so as to allow them to be handled as objects.

Then, an MHEG-5 content is created along with a scenario description file (referred to as a script) prescribing a relation among objects so as to obtain a display format of a scene (that is, a GUI screen) like the one explained earlier by referring to FIG. 4B and a format of picture sounds output in response to an operation.

As shown in FIG. 4B, the GUI screen also displays picture/sound data comprising MPEG video data based on material data received from the television program material server 6 and MPEG audio data based on musical material data received from the musical data material server 7 in an output format according to an operation.

Thus, as the aforementioned scenario description files, the GUI authoring system 42 handles picture/sound data based on material data received from the television program material server 6, MPEG audio data based on musical material data received from the musical data material server 7 and audio additional information received from the audio additional information server 8 as objects when necessary and creates an MHEG script for prescribing the relation among the objects.

It should be noted that data of an MHEG content transmitted by the GUI authoring system 42 includes script files, a variety of still-picture data files each handled as object and text files (and audio data files). The still picture data is data of 720 pixels×480 pixels compressed in accordance with the JPEG (Joint Photograph Experts Group) system whereas the text data is a file with a size not exceeding typically 800 characters.

Data containing MHEG content obtained in the GUI authoring system 42 is supplied to the DSM-CC encoder 44.

The DSM-CC encoder 44 converts the data received from the GUI authoring system 42 into a transport stream with a format that can be multiplexed into a data stream of video and audio data in MPEG2 format. The transport stream (TS) is made into a packet and supplied to the multiplexer 45.

The multiplexer 45 multiplexes video and audio packets received from the television program output system 39, audio packets received from the MPEG audio output system 43A, quadruple-speed audio packets received from the ATRAC audio output system 43B, audio additional information packets received from the audio additional information output system 41 and GUI data packets received from the GUI authoring system 42 along the time axis and encrypts them in accordance with key information output by the key information server 10 shown in FIG. 1.

The multiplexed data output by the multiplexer 45 is supplied to a wave output system 46 which typically carries out processing such as addition of error correction codes, and modulation and frequency transformation before supplying the multiplexed data to the satellite 2 by way of an antenna.

1-4 Transmission Format

The following description explains a transmission format which is adopted by this embodiment and prescribed on the basis of the DSM-CC system.

Figure 6:
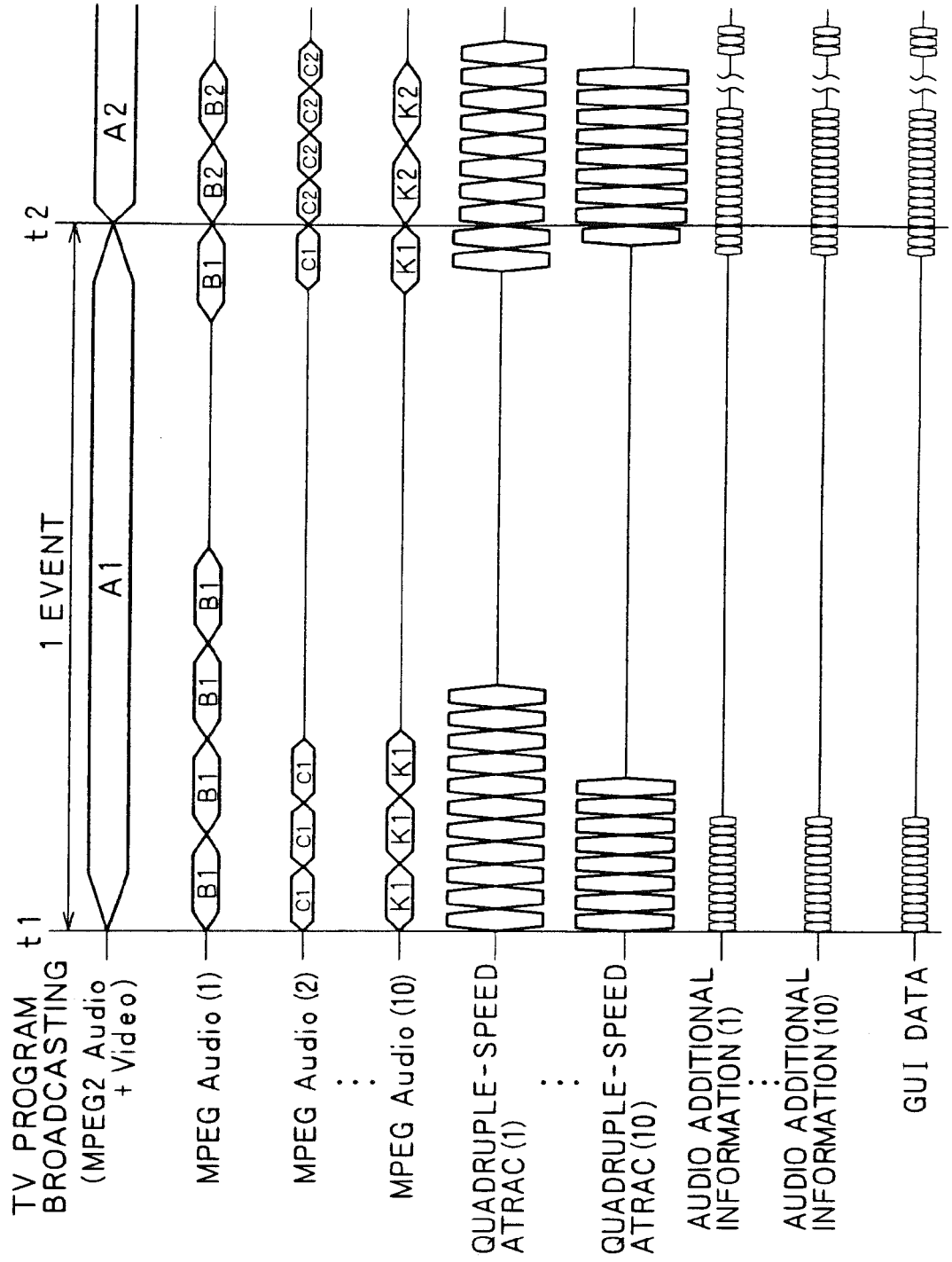
FIG. 6 is a timing chart of data transmitted by the ground station.
Figure 7:
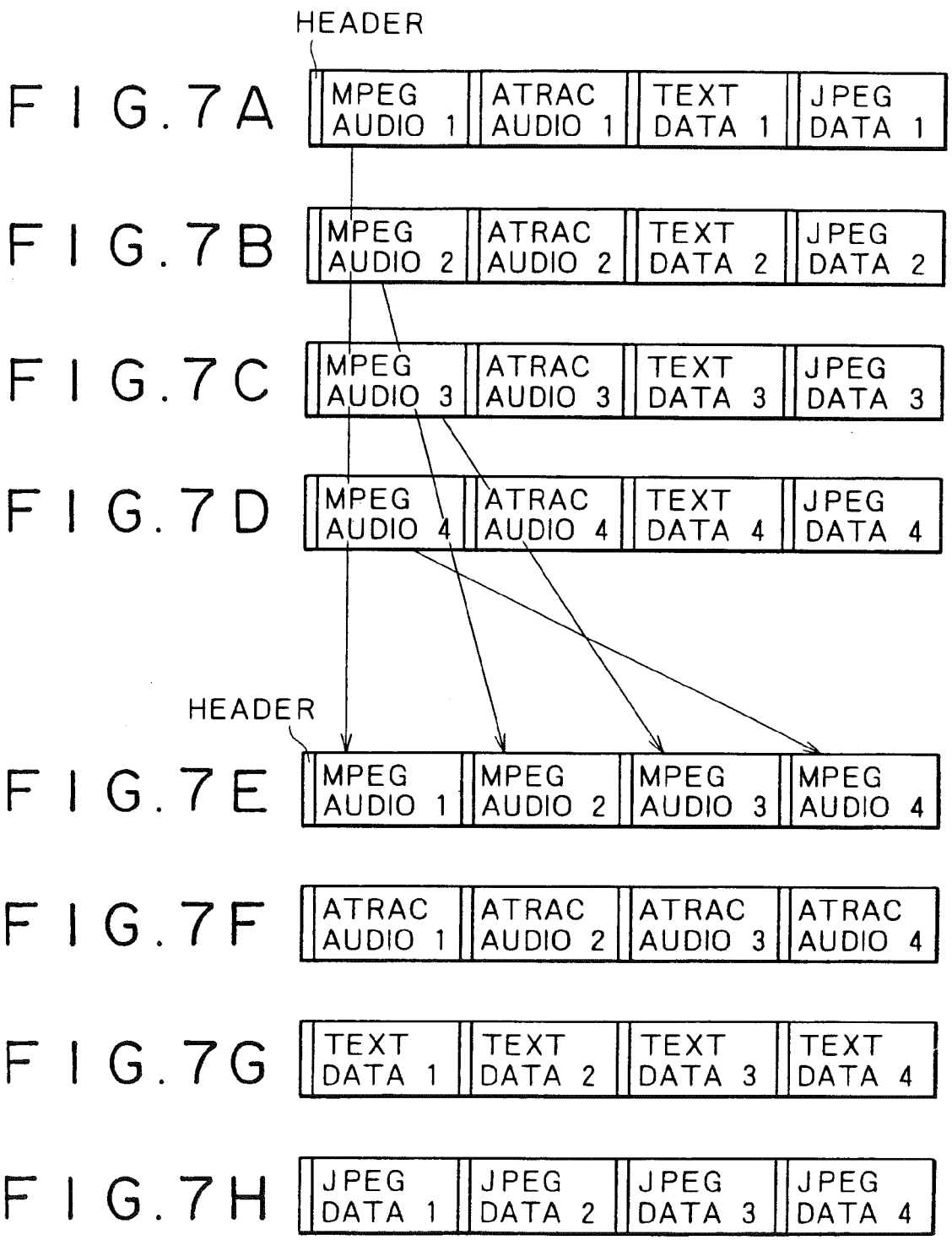
FIGS. 7A to 7H are explanatory diagrams showing a time-division multiplexed structure of transmitted data.

FIG. 6 is a diagram showing an example of data transmitted by the ground station 1 to the satellite 2. It should be noted that, as described before, pieces of data shown in the figure are actually multiplexed along the time axis. In FIG. 6, a period between points of time t1 and t2 shown in the figure is defined as an event. In the case of a musical-program channel, for example, an event is a unit for changing a line-up of a plurality of pieces of music. In this case, the event has a length of approximately 30 minutes to 1 hour.

As shown in FIG. 6, in the event between the points of time t1 and t2, a program having predetermined contents A1 is broadcasted as a broadcast of an ordinary moving-picture program. In an event starting at the point of time t2, contents A2 are broadcasted. In this ordinary program, a moving picture and sounds are broadcasted.

In this example, 10 channels, namely, CH1 to CH10, are provided to serve as MPEG audio channels (1) to (10). Through each of the audio channels CH1, CH2, CH3, - - -, CH10, the same music is transmitted repeatedly during the broadcasting time of an event. To be more specific, during the period of the event between the points of time t1 to t2, music B1, music C1 and so on are transmitted repeatedly through audio channels CH1, CH2 and so on respectively. Through the last audio channel CH10, music K1 is transmitted repeatedly. The repeated transmission described is also carried out through each of quadruple-speed ATRAC audio channels (1) to (10).

That is to say, an MPEG audio channel indicated by a number enclosed in parentheses ( ) as shown in the timing diagram of FIG. 6 is used for transmitting the same music as a quadruple-speed ATRAC audio channel indicated by the same number enclosed in parentheses ( ). In addition, audio additional information indicated by a channel number enclosed in parentheses ( ) is added to audio data transmitted through an audio channel indicated by the same number enclosed in parentheses ( ). Furthermore, still-picture data and text data transmitted as GUI data are also formed for each audio channel. As shown in FIGS. 7A to 7D, pieces of still-picture data and text data are multiplexed in transmitted MPEG2 transport packets on a time-division basis. As shown in FIGS. 7E to 7H, the packets are demultiplexed in the IRD 12 to reconstruct the original GUI data based on header information of each of the packets.

There is at least GUI data among pieces of transmitted data shown in FIGS. 6 and 7A to 7H. As previously discussed, this GUI data is used in data services, such as broadcasting or interactive broadcasting of MHEG contents synchronized with TV broadcasting or audio broadcasting. This GUI data is logically formed in accordance with the DSM-CC system as follows. The formation of the GUI data is exemplified only by data of a transport stream output by the DSM-CC encoder 44.

Figure 8:
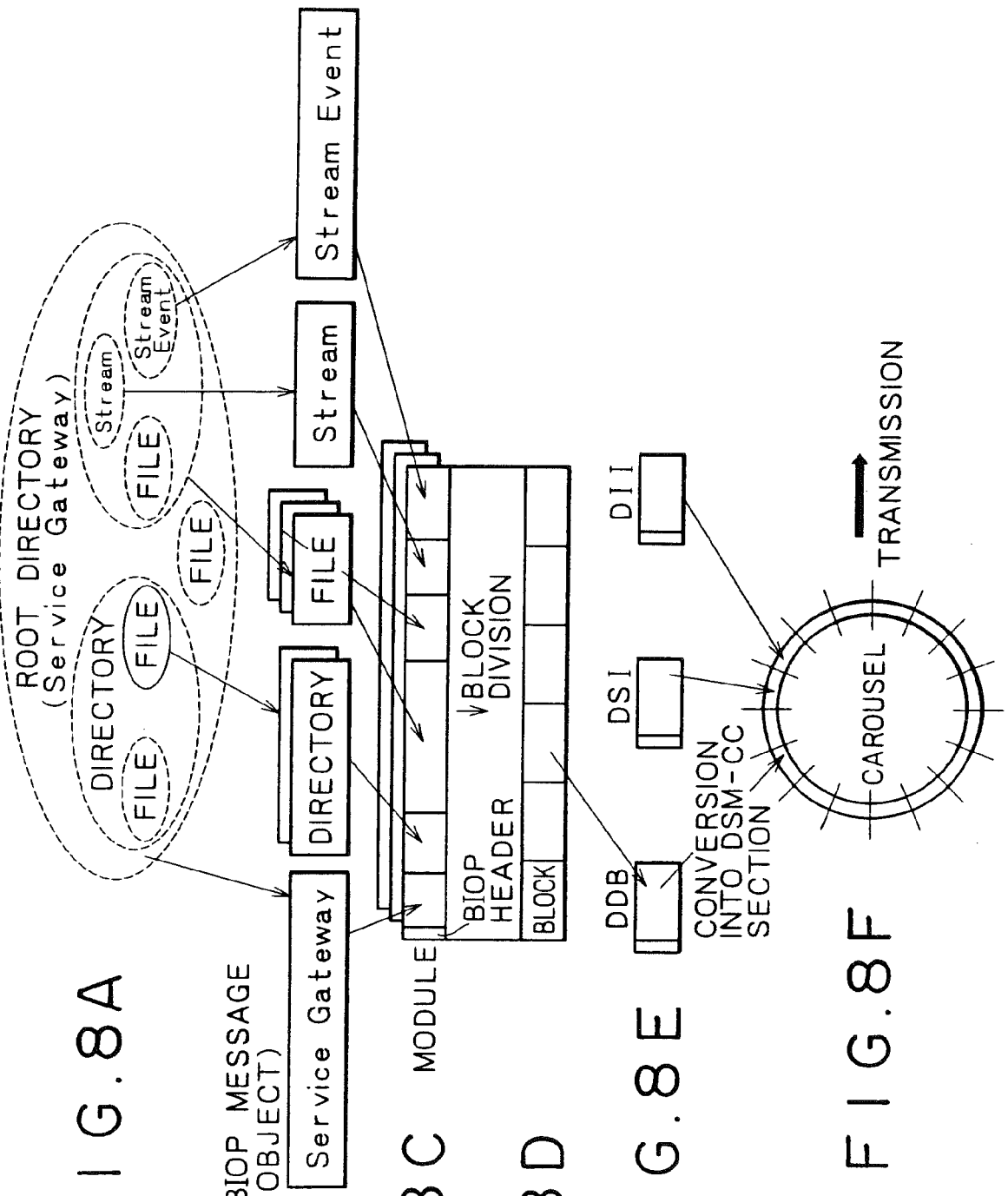
FIGS. 8A to 8F are explanatory diagrams showing a DSM-CC transmission format.

As shown in FIG. 8A, files to be transmitted in a data broadcasting service in this embodiment in accordance with the DSM-CC system are all included in a root directory named Service Gateway. Types of objects contained in the Service Gateway include directories, files, streams and stream events.

Files are individual data files for storing, among other information, a still picture, a sound, a text and a script described in conformity with the MHEG system.

A stream typically includes information linked to another data service and an AV stream such as MPEG video data used as a TV program material, audio data, MPEG audio data used as a musical material and ATRAC audio data.

A stream event includes links and time information.

A directory is a folder which is a collection of pieces of data related to each other.

As shown in FIG. 8B, in the DSM-CC system, these pieces of unit information and the Service Gateway itself are each handled as a unit known as an object which is converted into a format referred to as a BIOP message.

It should be noted that, in the explanation of the present invention, the classification of objects into files, streams and stream events is not essential. Thus, in the following description, the file is used as a representative object.

In addition, in the DSM-CC system, a data unit known as a module shown in FIG. 8C is generated. The module comprises one or more objects which are each converted into a BIOP message as shown in FIG. 8B. The module is a variable-length data unit including an additional BIOP header. This data unit is a buffering unit of data received on the reception side to be described later.

The DSM-CC system does not specially prescribe nor limit a relation among objects in the case of a module formed from a plurality of objects. In other words, in an extreme case, a module can be formed from 2 or more objects in scenes not related to each other at all without violating a prescription based on the DSM-CC system.

In order to transmit data in the form of sections prescribed by an MPEG2 format, the module is split into data units each basically having a fixed length as shown in FIG. 8D. This data unit is referred to as a mechanical block. It should be noted, however, that the last block in the module is not necessarily required to have a fixed length. The reason why the module is split into blocks in this way is that, in the MPEG2 format, there is a prescription stating that 1 section shall not exceed 4 KB.

In this case, what is meant by a section is a data unit defined as a block as described above.

As shown in FIG. 8E, a block obtained as a result of division of a module described above is converted into a message known as a DDB (Download Data Block) to which a header is added.

Concurrently with the conversion of a block into a DDB described above, control messages called a DSI (Download Server Initiate) and a DII (Download Indication Information) are generated.

The DSI and the DII are information required to acquire a module from data received by the IRD 12 on the reception side. The DSI includes mainly an identifier of a data transmission system known as a carousel (FIG. 8F) or module and information on the carousel as a whole, including the time the carousel takes to make 1 rotation and a time-out value of the carousel rotation. The information may also include data on the location of the root directory (Service Gateway) of the data services in the case of an object carousel system.

The DII is information corresponding to each module included in a carousel. To be more specific, the DII is information such as the size and the version of each module and the time-out value of the module.

Then, as shown in FIG. 8F, the 3 types of messages, namely, the DDB, the DSI and the DII, are output periodically and repeatedly by associating the messages with data units. In this way, the receiver is capable of receiving a module including an object required to obtain typically the desired GUI screen (or scene) at any time.

In this specification, the transmission system is called a carousel system if we compare the system with a merry-go-round. The data transmission technique represented by a model shown in FIG. 8F is known as a carousel.

A carousel may include a plurality of modules. For example, a plurality of modules required in a data service can be transmitted by using a carousel.

In addition, the carousel system is divided into 2 levels, namely, a data carousel system and an object carousel system. The object carousel system is capable of handling a directory structure wherein an object having an attribute of a file, a directory, a stream, a service gateway or the like is transmitted as data using a carousel a significant difference from the data carousel system. In the system implemented by this embodiment, the object carousel system is embraced.

Figure 9:
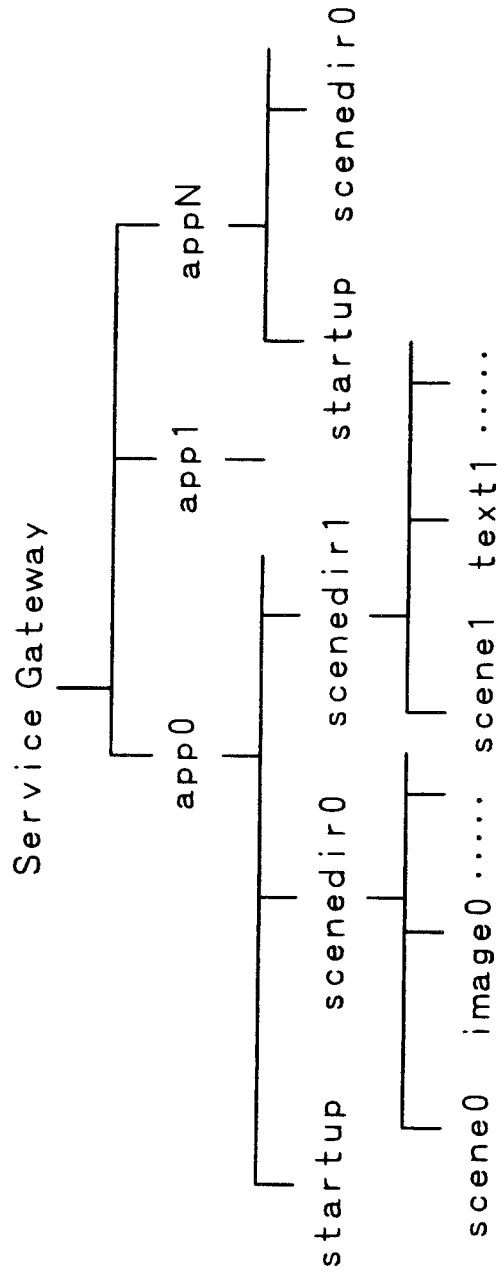
FIG. 9 is an explanatory diagram showing a typical directory structure of data services.

FIG. 9 is a diagram showing a typical directory structure of files (strictly speaking, MHEG application files) as a data service according to the MHEG system. As described above, the object carousel system is characterized in that the system is capable of handling a directory structure.

Normally, an MHEG application file serving as an entrance to a service domain is always a file called app0/startup placed right below the Service Gateway.

Basically, beneath the service domain (Service Gateway), application directories app0, app1, - - - , appN exist. Beneath each of the application directories, an application file called startup and directories of scenes composing the application exist. The directories of scenes are scene0, scene1 and so on. Beneath each of the scene directories, an MHEG scene file and content files composing the scene exist.

Figure 10:
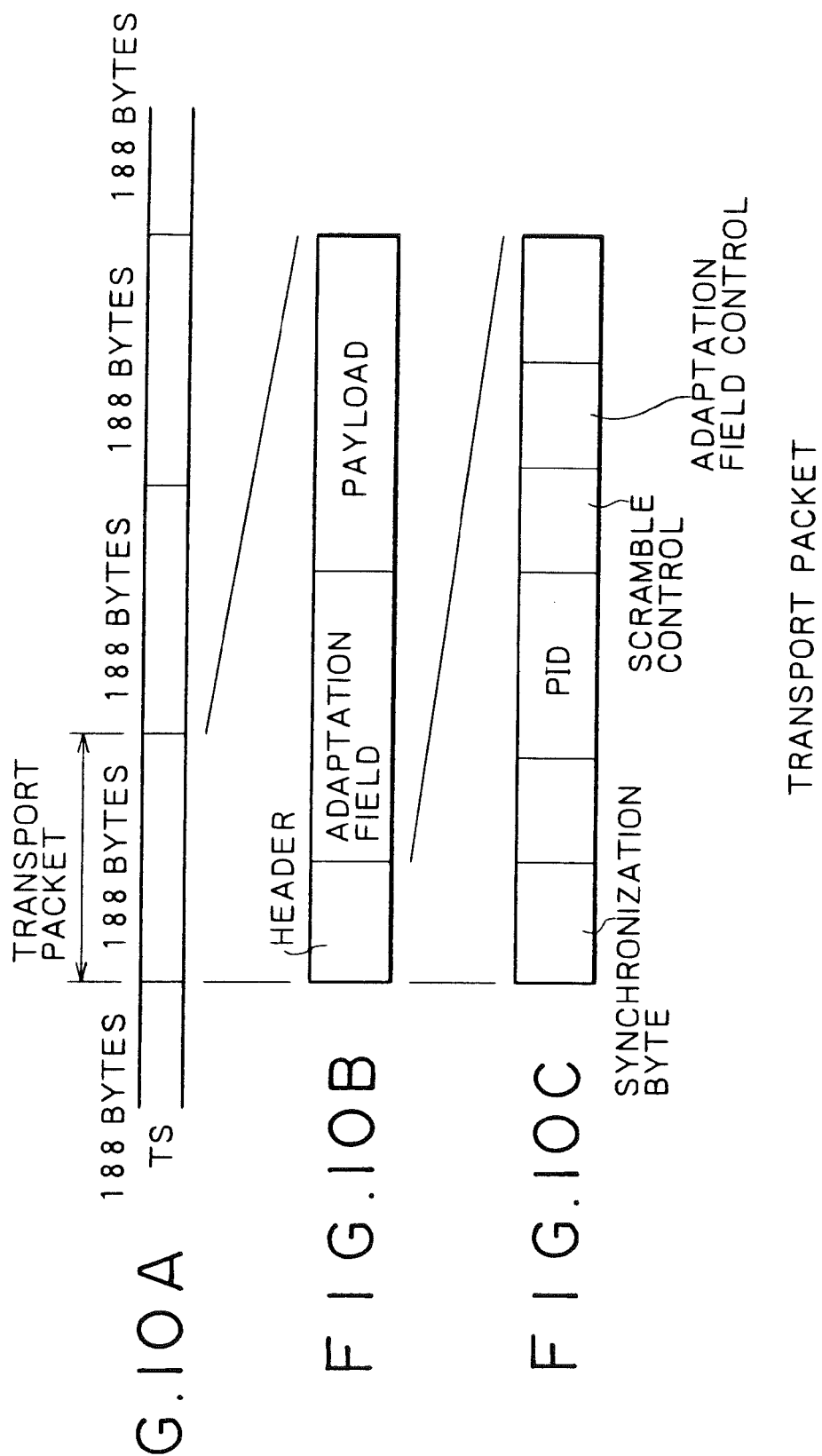
FIGS. 10A to 10C are diagrams showing the data structure of a transport stream.

In addition, broadcast data including GUI data transmitted by using a carousel as described above, that is, data produced by the multiplexer 45 shown in FIG. 5, is output in the form of a transport stream which has a typical structure like one shown in FIGS. 10A to 10C.

FIG. 10A is a diagram showing a transport stream. This transport stream is a bit stream defined by the MPEG system. As shown in the figure, the transport stream is a concatenation of packets (strictly speaking, transport packets) each having a fixed length of 188 bytes.

Each of the transport packets is shown in FIG. 10B. As shown in the figure, a transport packet comprises a header, an adaptation field for including additional information in this particular individual packet and a payload (or a data area) representing contents of the packet including video and audio data.

In actuality, the header is typically 4 bytes in length. As shown in FIG. 10C, the header always includes a synchronization byte at the beginning. At predetermined positions behind the synchronization byte, there are stored a PID (Packet_ID) serving as identification information of the packet, scramble control information indicating absence/presence of a scramble and adaptation field control information indicating, among others, absence/presence of the subsequent adaptation field and the payload.

The reception apparatus carries out a descrambling process based on these pieces of control information in packet units. Then, a demultiplexer can be used for separating and extracting needed packets such as video and audio data. In addition, it is also possible to reproduce time information used as a reference of a synchronous playback operation of video and audio data.

As is obvious from the description given so far, a transport stream comprises multiplexed packets of audio and video data pertaining to a plurality of channels. In addition, a signal called PSI (Program Specific Information) for implementing selection of a station, information (EMM/ECM) required for limited reception and SI (Service Information) for implementing services such as an EPG are also multiplexed at the same time in the transport stream. The limited reception is a reception function for determining whether or not it is possible to receive data through a fee-charging channel in dependence on the condition of a contract made with an individual.

The PSI which comprises 4 tables is explained by referring to FIGS. 11A to 11D. Each of the tables is expressed in a format conforming to an MPEG system known as a section format.

Figure 11:
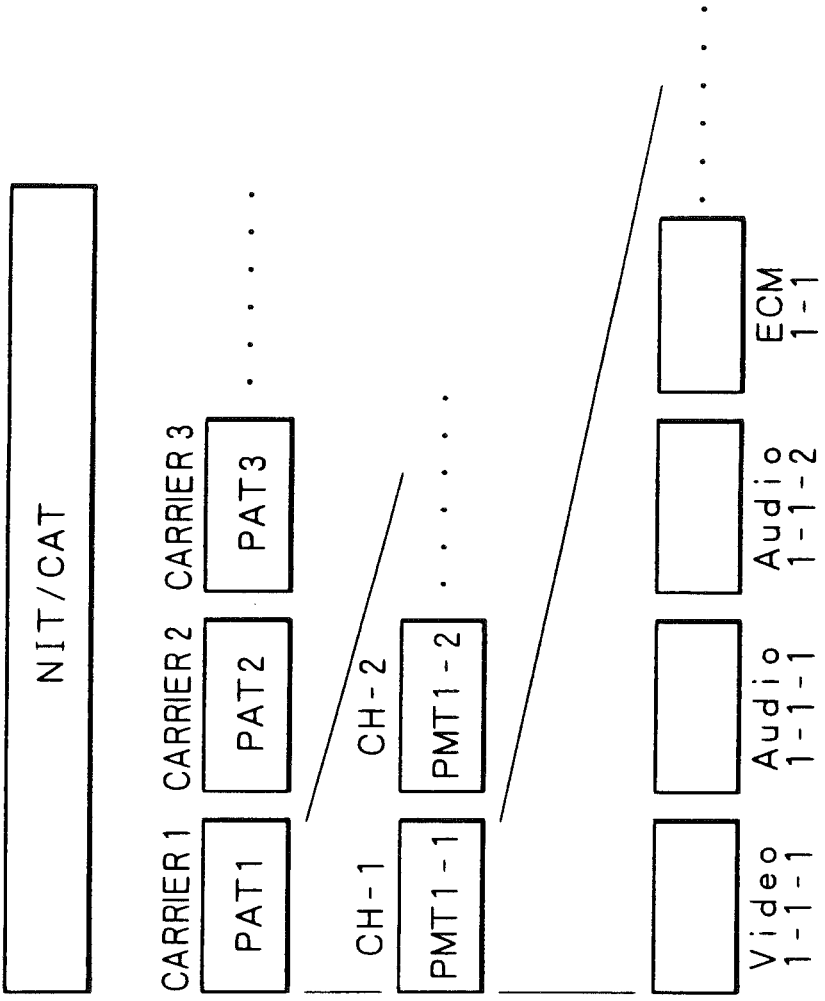
FIGS. 11A to 11D are explanatory diagrams showing a table structure of a PSI.

FIG. 11A is a diagram showing an NIT (Network Information Table) and a CAT (Conditional Access Table).

The same contents of the NIT are multiplexed for the entire carrier. The NIT includes transmission parameters such as a plane of polarization, a carrier frequency and a convolution rate as well as a list of channels superposed thereon. The PID of the NIT is set at 0x0010.

The same contents of the CAT are also multiplexed for the entire carrier. The CAT includes the PID of an EMM (Entitlement Management Message) packet which is individual data such as contract information and an identification of the limited-reception system. The PID of the CAT is set at 0x0001.

FIG. 11B is a diagram showing PATs which are each provided for a carrier. A PAT is information having contents peculiar to the carrier for which the PAT is provided. A PAT includes channel information in the associated carrier and the PID of a PMT representing contents of channels. Its PID is set at 0x0000.

FIG. 11C is a diagram showing PMTs (Program Map Table) which are each provided for a channel. A PMT is information for a channel in the carrier.

PMTs with contents varying from channel to channel are multiplexed. For example, the PID of a PMT shown in FIG. 11D is specified by a PAT. As shown in the figure, the PMT includes components (such as video and audio data) composing the channel and the PID of an ECM (Encryption Control Message) packet required for descrambling.

The SI (not shown) is a table with a section format like the PSI. The table includes information on an EPG. On the IRD side, necessary information is extracted from the table and displayed on a screen.

Representative tables of the PSI are an SDT (Service Description Table) and an EIT (Event Information Table).

The SDT represents information on a channel including the number, the name and contents of the channel. Its PID is set at 0x0011.

On the other hand, the EIT represents information on a program including the name, the start time, the outline of the program and a genre. Its PID is set at 0x0012.

1-5 IRD

Figure 12:
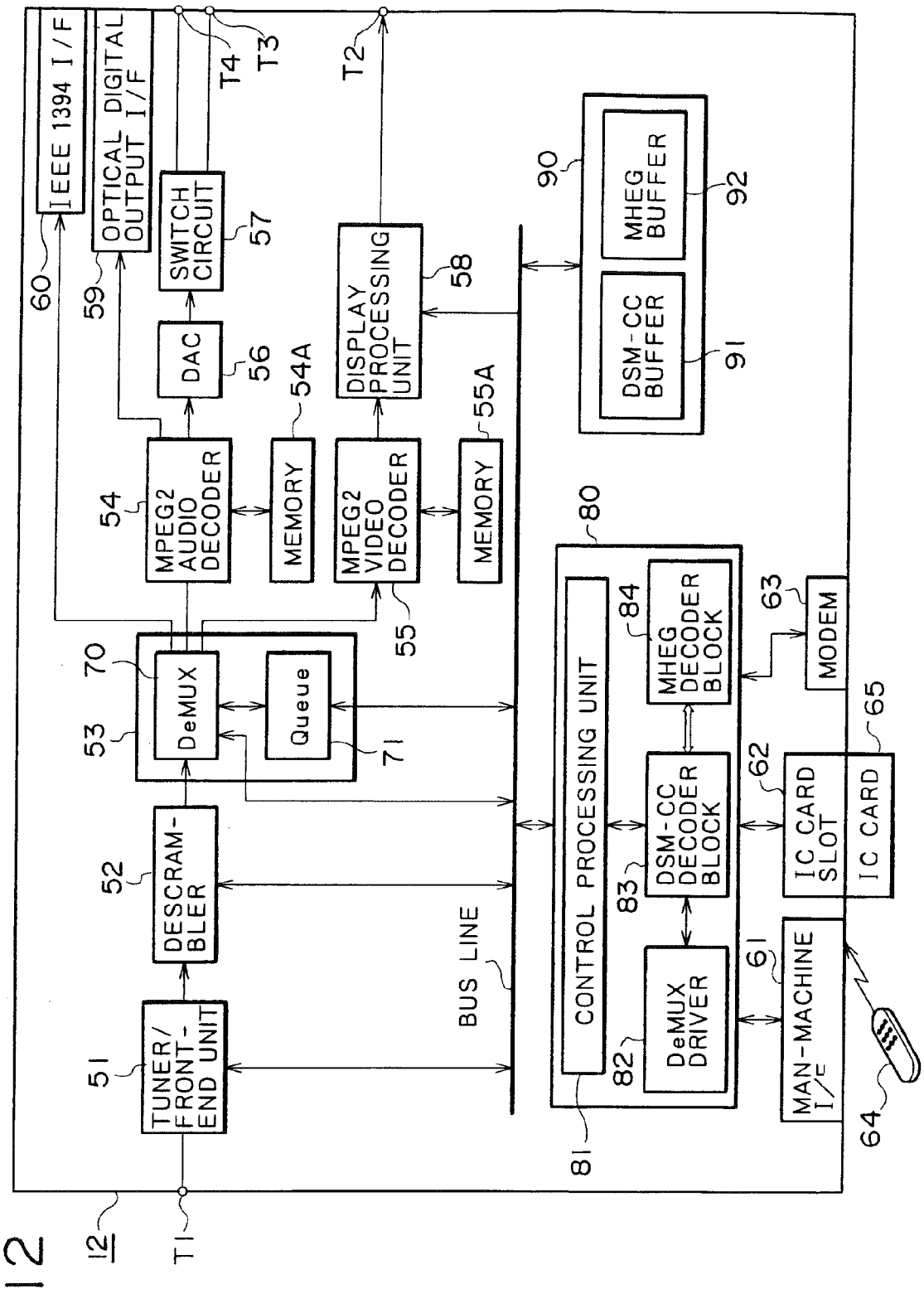
FIG. 12 is an explanatory diagram showing the configuration of the IRD.

Next, a typical configuration of the IRD 12 provided in the reception facility 3 is explained by referring to FIG. 12.

In the IRD 12 shown in the figure, a signal is received by an input terminal T1, being supplied to a tuner/front-end unit 51. The signal has been subjected to a predetermined frequency-transformation process in the LNB 15 of the parabola antenna 11.

The tuner/front-end unit 51 also receives a setting signal including transmission parameters from the CPU (Central Processing Unit) 80. The setting signal is used to determine the frequency of a carrier to be received. The tuner/front-end unit 51 then carries out processing such as bitabi demodulation and error correction to obtain a transport stream.

The transport stream obtained by the tuner/front-end unit 51 is supplied to a descrambler 52. In addition, the tuner/front-end unit 51 also acquires a PSI packet from the transport stream to update its information on selection of a station. The tuner/front-end unit 51 supplies the component PID of each channel obtained from the transport stream to typically the CPU 80 which uses the PID for processing the received signal.

The descrambler 52 receives descrambler-key data stored in an IC card 65 by way of the CPU 80. A PID is set by the CPU 80. Then, the descrambler 52 carries out descramble processing based on this descramble key data and the PID, supplying a result of the descramble processing to a transport unit 53.

The transport unit 53 comprises a demultiplexer 70 and a queue 71 which is typically implemented by a DRAM or the like. The queue 71 is an array of a plurality of memory areas each corresponding to a module unit. In the case of this embodiment, for example, the array comprises 32 memory areas. Thus, information of up to 32 modules can be stored in the queue 71.

The operation of the demultiplexer 70 is explained briefly as follows. In accordance with a filter condition set by a DeMUX driver 82 employed in the CPU 80, a necessary transport packet is extracted from the transport stream received from the descrambler 52 and, if necessary, the queue 71 is used as a work area to obtain pieces of data with formats like the ones shown in FIGS. 7E to 7H. The pieces of data are then supplied to their respective functional circuits requiring them.

The MPEG video data and the MPEG audio data are separated by the demultiplexer 70 and supplied to an MPEG2 video decoder 55 and an MPEG audio decoder 54 respectively. Individual packets of the separated video and audio data are supplied to their respective decoders in a format known as a PES (Packet Elementary Stream).

As for data of MHEG contents in the transport stream, the demultiplexer 70 separates and extracts the data from the transport stream in transport-packet units and stores them in appropriate memory areas in the queue 71 so as to collect the data for each module. The data of MHEG contents collected for each module is then written into a DSM-CC buffer 91 of a main memory 90 to be stored there by way of a data bus under control executed by the CPU 80.

In addition, also in the case of the quadruple-speed ATRAC data (that is, compressed audio data) in a transport stream, necessary data is separated and extracted by the demultiplexer 70 typically in transport-packet units which are then output to an IEEE1394 interface 60. In addition to audio data, video data and a variety of command signals or the like can also be output by way of the IEEE1394 interface 60.

The MPEG video data having a PES format supplied to the MPEG2 video decoder 55 is subjected to a decoding process according to the MPEG2 format with a memory 55A used as the work area. The decoded video data is then supplied to a display processing unit 58.

In addition to the decoded video data received from the MPEG2 video decoder 55, the display processing unit 58 also receives video data such as a GUI screen for data services obtained from an MHEG buffer 92 of the main memory 90 as will be described later. In the display processing unit 58, the video data received thereby is subjected to necessary signal processing for converting the data into an analog audio signal conforming to a predetermined television system. The analog audio signal is then output to an analog video output terminal T2.

By connecting the analog video output terminal T2 to a video input terminal of the monitor unit 14, a screen like the one shown in FIGS. 4A and 4B can be displayed on the monitor unit 14.

The PES MPEG audio data supplied to the MPEG2 audio decoder 54 is subjected to a decoding process according to the MPEG2 format with the memory 54A used as a work area. The decoded video data is supplied to a D/A converter 56 and an optical digital output interface 59.

In the D/A converter 56, the decoded video data received thereby is converted into an analog audio signal which is then supplied to a switch circuit 57. The switch circuit 57 switches the signal path so as to supply the analog audio signal to either an analog audio output terminal T3 or an analog audio output terminal T4.

The analog audio output terminal T3 is connected to an audio input terminal of the monitor unit 14. On the other hand, the analog audio output terminal T4 is a terminal for outputting downloaded music as an analog signal.

In addition, the optical digital output interface 59 converts digital audio data received thereby into an output optical digital signal. In this case, the optical digital output interface 59 conforms typically to the IEC 958.

The main memory 90 is used as a work area in various kinds of control processing carried out by the CPU 80. In this embodiment, the main memory 90 includes areas used as the DSM-CC buffer 91 and the MHEG buffer 92 described earlier.

The MHEG buffer 92 is a work area used for creating picture data (such as picture data of a GUI screen) generated in accordance with a script conforming to the MHEG system. The picture data generated by using the MHEG buffer 92 is supplied to the display processing unit 58 by way of a bus line.

The CPU 80 executes overall control in the IRD 12. Thus, the CPU 80 also controls the separation and the extraction of data in the demultiplexer 70.

The CPU 80 also decodes data of MHEG contents acquired thereby in order to form a GUI screen (or a scene) in accordance with described contents of a script and output the screen.

In order to accomplish the functions described above, the CPU 80 employed in this embodiment is typically provided with at least the DeMUX driver 82, a DSM-CC decoder block 83 and an MHEG decoder block 84 in addition to a control processing unit 81. In this embodiment, among components of the CPU 80, at least the DSM-CC decoder block 83 and the MHEG decoder block 84 are implemented by software.

The DeMUX driver 82 sets a filter condition in the demultiplexer 70 on the basis of the PID of an input transport stream.

The DSM-CC decoder block 83 functions as a DSM manager, reconstructing data of MHEG contents for a module unit stored in the DSM-CC buffer 91. In addition, the DSM-CC decoder block 83 also carries out processing related to a necessary DSM-CC decoding process in accordance with accesses from the MHEG decoder block 84.

The MHEG decoder block 84 carries out decode processing for outputting a scene by accessing data of MHEG contents in the DSM-CC buffer 91 obtained by the DSM-CC decoder block 83, that is, data of an MHEG content obtained in the DSM-CC buffer 91. That is to say, the MHEG decoder block 84 creates a scene by implementing a relation among objects prescribed by a script file of the MHEG content. In the creation of a GUI screen used as the scene, the MHEG buffer 92 is used to generate data of the GUI screen in accordance with the contents of the script file.

As an interface between the DSM-CC decoder block 83 and the MHEG decoder block 84, a U-U API (DSM-CC U-U API (Application Portability Interface)) is adopted.

The U-U API is an interface used by a client (the MHEG decoder block 84) for allowing access to a DSM Manager object which is an object for implementing a DSM function (the DSM-CC decoder block 83). To be more specific, the U-U API is an API for allowing structural access to treat objects each having an attribute like a file system. Examples of such objects are the Service Gateway, directories, files, streams and stream events which are included in the carousel.

Thus, access to an object included in the carousel can be made through the API by merely specifying a bus name without the necessity for a program (or a client) using the carousel to be concerned with a carousel reception operation.

In addition, the U-U API is a set of interfaces prescribed to be usable without regard to a data transfer system at a low layer. Thus, a program utilizing this API has a merit of an ability to use this API in any data transfer system providing the U-U API.

The following description explains a typical operation to extract a desired object required for creation of a scene from a transport stream in accordance with control executed by the CPU 80.

In the DSM-CC protocol, an IOR (Interoperable Object Reference) is used for indicating the location of an object in a transport stream. An IOR includes an identifier corresponding to a carousel for finding the object, an identifier of a module including the object (hereinafter "module id"), an identifier for identifying the object in the module (hereinafter "object key") and a tag for identifying a DII having information on the module including the object (hereinafter "association tag").

The DII having information on the module includes the module id and the association tag for each module.

After an IOR extracted from a transport stream is identified by the CPU 80, the following processes are carried out for receiving and separating objects indicated by the IOR.

1. An ES (elementary stream) loop of the PMT in a carousel is searched for an elementary stream having the same value as the associationtag of the IOR to obtain a PID. The ES having this PID includes a DII.

2. This PID and a tableidextension are set in the demultiplexer 70 as a filter condition. Under this condition, the demultiplexer 70 then separates the DII and outputs it to the CPU 80.

3. In the DII, an associationtag of a module indicated by a moduleid included in the IOR is set.

4. The ES loop of the PMT is searched for an ES having the same value as the associationtag described above and a PID is obtained. The target module is included in an ES having this PID.

5. The demultiplexer 70 carries out filtering using the PID and the moduleid as a filter condition. A transport packet separated and extracted in accordance with this filter condition is stored in a proper memory area (an array) in the queue 71 to eventually form a target module.

6. A target object corresponding to an objectkey included in the aforementioned IOR is taken out from the target module. The target object is written into a predetermined area of the DSM-CC buffer 91.

Typically, the above operation is carried out repeatedly to collect target objects and store them in the DSM-CC buffer 91. In this way, an MHEG content for creating a required scene is obtained.

A man-machine interface 61 receives a command signal transmitted by a remote controller 64, supplying the signal to the CPU 80. The CPU 80 then carries out necessary control processing to accomplish an apparatus operation according to the command signal received from the man-machine interface 61.

An IC card 65 is inserted into the IC card slot 62. The CPU 80 writes and reads out information into and from the IC card 65.

The modem 63 is connected to the accounting server 5 by a telephone line 4 and controlled by the CPU 80 to allow the IRD 12 to communicate with the accounting server 5.

The following description complementarily explains the flow of a signal serving as a video/audio source in the IRD 12 with reference to the display format explained earlier by referring to FIGS. 4A and 4B.

In processing to output an ordinary program shown in FIG. 4A, MPEG video data and MPEG audio data required for the program are extracted from an input transport stream and then subjected to their respective decoding processes. Subsequently, the MPEG video data and the MPEG audio data are output to the analog video output terminal T2 and the analog audio output terminal T3 respectively to have the monitor unit 14 display a picture and generate sounds of the broadcast program.

In processing to output a GUI screen shown in FIG. 4B, on the other hand, data of an MHEG content required for the GUI screen (or a scene) is separated and extracted by a transport unit 53 from an input transport stream and supplied to the DSM-CC buffer 91. Then, the DSM-CC decoder block 83 and the MHEG decoder block 84 function to create picture data of the scene (the GUI screen) in the MHEG buffer 92 by using the extracted data. Subsequently, the picture data is supplied to the analog video output terminal T2 by way of a display processing unit 58 to display the GUI screen on the monitor unit 14.

Assume that a piece of music is selected from the musical list 21B displayed on the GUI screen shown in FIG. 4B and the audio data of the selected music is listened to by the user on a trial basis. In this case, the MPEG audio data of the selected music is generated by the demultiplexer 70. The MPEG audio data is then output to the monitor unit 14 as an analog audio signal by way of an MPEG audio decoder 54, a D/A converter 56, a switch circuit 57 and the analog audio output terminal T3.

Assume that the download button 28 displayed on the GUI screen shown in FIG. 4B is pressed to download musical audio data. In this case, the musical audio data to be downloaded is extracted by the demultiplexer 70 and supplied to the analog audio output terminal T4, the optical digital output interface 59 or the IEEE1394 interface 60.

Assume that an MD recorder/player 13A of FIG. 12 conforming to the IEEE1394 specifications is connected to the IEEE1394 interface 60. In this particular case, the demultiplexer 70 extracts quadruple-speed ATRAC data of the downloaded music and outputs the data to the IEEE1394 interface 60 to be recorded onto a disc mounted on the MD recorder/player 13A. At the same time, the demultiplexer 70 also extracts still picture data of the album jacket and text data such as the lyrics and the profile of an artist from the transport stream, and supplies the data to the MD recorder/player 13A by way of the IEEE1394 interface 60. It should be noted that the data in the transport stream has been compressed in accordance with typically the JPEG system. The still picture data and the text data are recorded into a predetermined area in a disc mounted on the MD recorder/player 13A.

2 Authoring System
2-1 Structure of MHEG Content

Next, an MHEG authoring system provided by this embodiment is explained.

In the case of FIG. 5, the MHEG authoring system of this embodiment explained below corresponds to the GUI authoring system 42. It should be noted, however, that since a personal computer is actually used for creating or obtaining GUI material data (such as a text file or a picture used as an object) in order to carry out authoring work, functionally, the GUI material cataloging system 34 and the GUI material data base 38 can be included in addition to the GUI authoring system 42.

Figure 13:
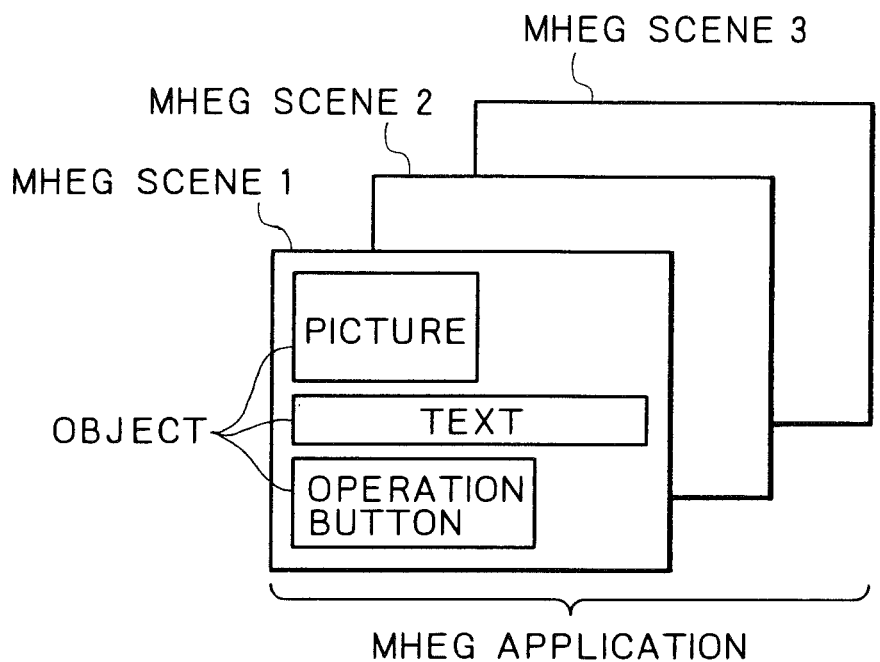
FIG. 13 is an explanatory diagram showing the structure of an MHEG content.
Figure 14:
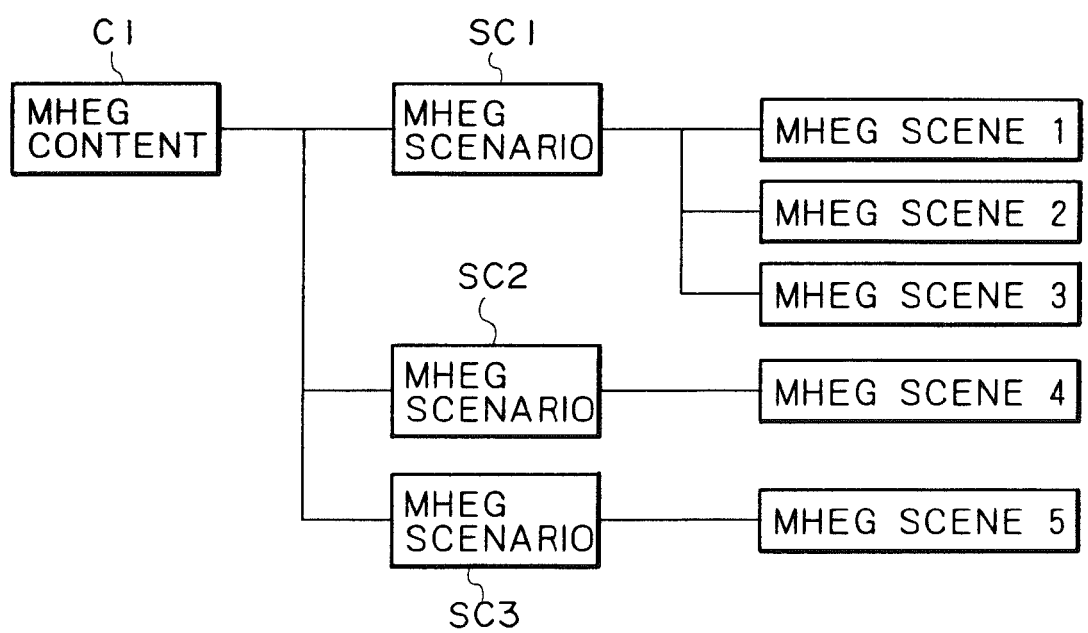
FIG. 14 is an explanatory diagram showing the structure of an MHEG content.

FIGS. 13 and 14 are diagrams conceptually showing the structure of an MHEG content created by the MHEG authoring system provided by this embodiment.

To be more specific, FIG. 13 is a diagram showing 3 scenes, namely, MHEG scene 1 to MHEG scene 3. Each of the scenes is formed as a combination of objects pasted on a picture area with a size of typically one picture.

It should be noted that an MHEG scene is a scene conforming to the MHEG system. In this specification, a scene is referred to as an MHEG scene in some cases in order to distinguish it from a shared scene to be described later. Conversely speaking, in the following description, by a scene, an MHEG scene is meant.

As described earlier, an object is interpreted as, among other things, picture information such as a JPEG or GIF still-picture file, text information, a part picture file such as an operation button and an audio data file. In the case of this embodiment, the monitor display is switched from one scene to another in synchronization with typically a TV broadcast or switched by an operation of the switch button. In this embodiment, switching of the monitor display from one scene to another is referred to as a transition.

Assume for example that the 3 scenes, namely MHEG scene 1 to MHEG scene 3, are related to each other in accordance with a consistent relation such as a relation allowing a transition to occur between any two of them. The relation among them is arranged into a scenario unit (or MHEG application unit).

The scenario used in this case has a meaning different from a description file used as a script. That is to say, a scenario implies a content unit at a hierarchical layer of an MHEG application. A scenario unit is typically provided with pieces of information such as a data type, customized info, a scene number and information called an ES name, which is the name of the elementary stream to which the present scenario is output, and is formed to include 1 or more MHEG scenes. It should be noted that the datatype is the data type of the present scenario. An example of the data type is "mheg". The customizedinfo is customized information and the scenenumber is the number of scenes included in the scenario.

A set of scenarios which are each an arrangement of scenes forms an MHEG content as shown in FIG. 14.

In an example shown in the figure, the MHEG content comprises 3 scenarios, namely, scenarios SC1, SC2 and SC3.

Scenario SC1 comprises 3 scenes, namely, scenes 1, 2 and 3. The remaining scenarios SC2 and SC3 comprise MHEG scenes 4 and 5 respectively.

As shown in FIG. 13, objects are used for creating a scene. According to MHEG specifications, a shared object can also be used.

A shared object is an object that can be used by being shared among a plurality of scenes forming an MHEG application.

An example of shared objects is shown in FIG. 15. As shown in the figure, 1 MHEG application comprises 2 scenes, namely, MHEG scenes 1 and 2. The MHEG content includes 6 prepared objects, namely, objects 1 to 3 and 4 to 6 in addition to 3 shared objects, namely, shared objects 1 to 3.

Objects 1 to 3 are used for creating only MHEG scene 1 while objects 4 to 6 are used for creating only MHEG scene 2.

On the other hand, shared objects 1 to 3 are each an object that can be set as an object usable and sharable by both MHEG scenes 1 and 2.

Thus, in the case of the example shown in FIG. 15, MHEG scene 1 can be created by using objects 1 to 3 and shared objects 1 to 3 while MHEG scene 2 can be created by using objects 4 to 6 and shared objects 1 to 3.

As explained earlier in the description of the conventional apparatus, the interface of the contemporary MHEG authoring tool allows the user to carry out only editing work of setting a flag indicating whether or not a shared object is to be used for all of a plurality of scenes constituting an MHEG application even if a shared object can be set.

In the case of the example shown in FIG. 15, if shared objects 1 to 3 are set for use, for instance, it is possible to obtain only states in which shared objects 1 to 3 are always used and displayed for MHEG scenes 1 and 2. If shared objects 1 to 3 are set for no use, on the other hand, it is possible to obtain only states in which shared objects 1 to 3 are not displayed for both MHEG scenes 1 and 2.

Conversely speaking, it is impossible to set usage of objects in which, for example, shared objects 1 and 2 are selected for MHEG scene 1 whereas shared object 3 is selected for MHEG scene 2. In an attempt to carry out editing work using a shared object with a high degree of freedom, it becomes necessary to write a script for controlling the shared objects themselves. For this reason, the editor must be proficient in the script language as has been described earlier.

As will be described below, the MHEG authoring tool provided by this embodiment is configured to provide a simple interface which can be used by anybody but allows a shared object to be set for a scene with a high degree of freedom.

2-2 Concept of a Shared Scene

A shared scene is prescribed in the editing process based on an internal format of the MHEG authoring tool provided by this embodiment.

A shared scene is a virtual scene which is created by using one or more arbitrary objects. A shared scene is handled as a layer-like edit material to be used or displayed by superposition on a prepared MHEG scene. In addition, a shared scene is used by being shared among MHEG scenes forming one MHEG application.

FIGS. 16A to 16F are explanatory diagrams showing the concept of a basic editing operation using shared scenes.

Assume that shared scenes 1 and 2 shown in FIGS. 16A and 16B have been created and prepared by using the MHEG authoring tool provided by this embodiment. In this case, shared scene 1 is created into a state in which object ob1 is displayed at a position shown in the figure. Object ob1 shown in shared scene 1 is a partial picture of an operation button marked with "Next". On the other hand, shared scene 2 is created into a state in which object ob2 is displayed at a position shown in the figure. Object ob2 shown in shared scene 2 is a partial picture of an operation button marked with "Return".

It should be noted that a shared scene can be created by carrying out necessary editing operations using a material comprising a variety of objects in an environment of the MHEG authoring tool provided by this embodiment.

Shared scenes 1 and 2 are set so that they can be used in an MHEG content provided with 4 scenes, namely, MHEG scenes 1 to 4 as shown in FIGS. 16C to 16F respectively. MHEG scenes 1 to 4 are edited to display the operation buttons "Next" and/or "Return" so as to allow transitions described later to take place as shown in FIGS. 16C to 16F.

MHEG scene 1 shown in FIG. 16C is a scene serving as a base point of the transitions. That is why only the Next operation button is displayed thereon. MHEG screen 1 is prescribed so that, when this Next button is operated, a transition from MHEG scene 1 to MHEG scene 2 takes place.

MHEG scene 2 shown in FIG. 16D displays both the Next and Return operation buttons. MHEG screen 2 is prescribed so that, when the Next button is pressed, a transition from MHEG scene 2 to MHEG scene 3 takes place and, when the Return button is pressed, on a transition from MHEG scene 2 back to MHEG scene 1 takes place.

By the same token, MHEG scene 3 shown in FIG. 16E displays both the Next and Return operation buttons. MHEG screen 3 is prescribed so that, when the Next button is pressed, a transition from MHEG scene 3 to MHEG scene 4 takes place and, when the Return button is pressed, a transition from MHEG scene 3 back to MHEG scene 2 takes place.

MHEG scene 4 shown in FIG. 16F is a scene serving as the last scene of the transitions. That is why only the Return operation button is displayed thereon. MHEG screen 4 is prescribed so that, when the Return button is pressed, a transition from MHEG scene 4 back to MHEG scene 3 takes place.

It should be noted that, in actuality, each of MHEG scenes 1 to 4 generally displays scene objects at the same time too. In this case, however, only objects included in shared scenes are displayed for the sake of clarity. In addition, a shared scene provided by this embodiment may be created in general to use a plurality of objects. In this example, however, shared scenes 1 and 2 include only 1 object for clarity of expression.

As described above, MHEG scenes 1 to 4 are edited to include the operation buttons "Next" and/or "Return" so as to allow the transitions to take place. In order to display either or both of the operation buttons, a relation among MHEG scenes and shared scenes needs to be described.

First of all, when MHEG scene 1 is edited, shared objects 1 and 2 are set at ON (RUN) and OFF (STOP) states respectively as shown at the bottom of MHEG scene 1 of FIG. 16C. In these states, only shared object ob1 is selected and used in MHEG scene 1. That is to say, the editing work results in a state in which MHEG scene 1 displays shared object ob1 but not shared object ob2 as shown in FIG. 16C.

Then, when MHEG scene 2 is edited, shared objects ob1 and ob2 are both set at an ON (RUN) state as shown at the bottom of MHEG scene 2 of FIG. 16D. In this state, both shared objects ob1 and ob2 are selected and used in MHEG scene 2. That is to say, the editing work results in a state in which MHEG scene 2 displays both shared object ob1 and shared object ob2 as shown in FIG. 16D. By the same token, when MHEG scene 3 is edited, shared objects ob1 and ob2 are both set at an ON (RUN) state as shown at the bottom of MHEG scene 3 of FIG. 16E. In this state, both shared objects ob1 and ob2 are selected and used in MHEG scene 3. That is to say, the editing work results in a state in which MHEG scene 3 displays both shared object ob1 and shared object ob2 as shown in FIG. 16E.

Finally, when MHEG scene 4 is edited, shared objects ob2 and ob1 are set at ON (RUN) and OFF (STOP) states respectively as shown at the bottom of MHEG scene 4 of FIG. 16F. In these states, only shared object ob2 is selected and used in MHEG scene 4. That is to say, the editing work results in a state in which MHEG scene 4 displays shared object ob2 but not shared object ob1 as opposed to the display of MHEG scene 1.

As described above, a shared scene is a virtual scene which can be used by being shared among MHEG scenes constituting an MHEG content. As a result, an object used for such a shared scene is an object used by being shared among MHEG scenes constituting an MHEG content. That is to say, an object used for such a shared scene is the same as a shared object defined in the MHEG specifications.

In other words, shared objects are not controlled individually in this embodiment. Instead, shared objects are each controlled as an object included in a shared scene.

If a plurality of shared scenes are used for 1 MHEG scene in this embodiment, an order of superposition of the shared scenes on the MHEG scene should be specified. As a rule, when a plurality of shared scenes are used for 1 MHEG scene in this embodiment, the shared scenes are superposed on each other in a specified order to create a picture which is then placed in front of or on the picture of the MHEG scene.

FIGS. 17A to 17D are explanatory diagrams showing typical displays of scenes superposed in a specified order.

Figures 17A, 17B:
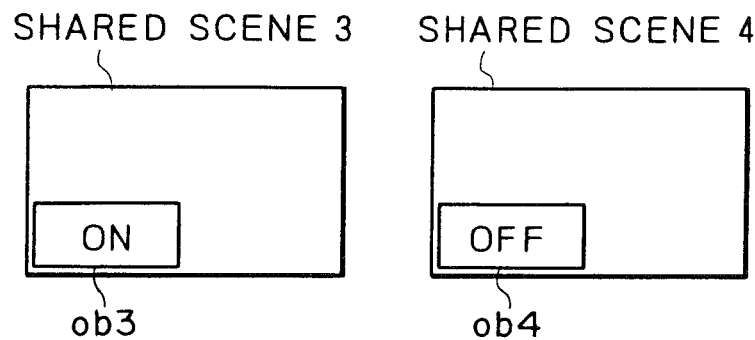
FIGS. 17A to 17D are explanatory diagrams showing an example of scene editing using shared scenes.

In the example shown in the figure, 2 shared scenes, namely, shared scenes 3 and 4, are prepared as shown in FIGS. 17A and 17B respectively. Shared scene 3 is formed to include object ob3 of an ON button picture displayed at a position shown in the figure. On the other hand, shared scene 4 is formed to include object ob4 of an OFF button picture displayed at a position shown in the figure. The position of object ob3 on shared scene 3 coincides with the position of object ob4 on shared scene 4.

Figures 17C, 17D:
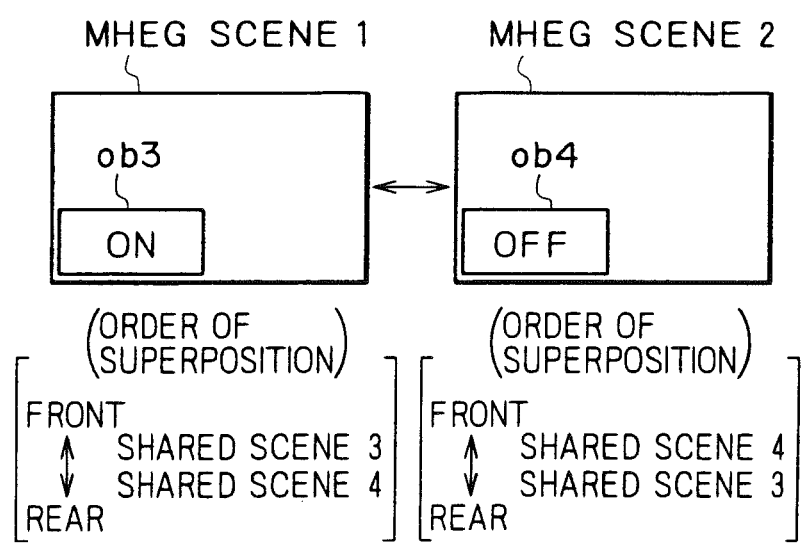

Shared scenes 3 and 4 are both put in an ON (RUN) state-and shared by MHEG scenes 1 and 2. FIG. 17C is a diagram showing MHEG scene 1 using shared scenes 3 and 4. On the other hand, FIG. 17D is a diagram showing MHEG scene 2 using also the 2 shared scenes, namely shared scenes 3 and 4.

As shown at the bottom of FIG. 17C, in the order of superposition of shared scenes 3 and 4, shared scenes 3 and 4 are superposed on MHEG scene 1 with shared scene 3 put at the front end and shared scene 4 put at the rear end.

As a result, only object ob3 representing the ON button picture is visible on MHEG scene 1 as shown in FIG. 17C. On the other hand, object ob4 representing the OFF button picture is concealed behind object ob3 and, hence, invisible.

Thus, MHEG scene 1 is a GUI screen whereby when the ON button is pressed. MHEG a transition takes place to replace MHEG scene 1 by MHEG scene 2.

In the case of MHEG scene 2, on the other hand, in the order of superposition of shared scenes 3 and 4, shared scenes 3 and 4 are superposed on MHEG scene 2 with shared scene 4 put at the front end and shared scene 3 put at the rear end as shown at the bottom of FIG. 17D.

As a result, only object ob4 representing the OFF button picture is visible on MHEG scene 2 as shown in FIG. 17D. On the other hand, object ob3 representing the ON button picture is concealed behind object ob4 and, hence, invisible.

Thus, MHEG scene 2 is a GUI screen whereby when the OFF button is pressed a transition takes place to replace MHEG scene 2 by MHEG scene 1.

Thus, when the user looks at the real GUI screen, the screen is switched from a display of the ON button picture to a display of the OFF button picture or vice versa each time the ON or OFF button is operated respectively.

As described above, shared objects are handled in the MHEG authoring tool provided by this embodiment in a configuration wherein the shared objects are controlled by shared scenes. Thus, by setting whether or not to use a shared scene in an MHEG scene as described by referring to FIGS. 16A to 16F, shared objects for each MHEG scene can be selected for use in the MHEG scene. In addition, by specifying an order of superposition of shared scenes as described earlier by referring to FIGS. 17A to 17D, it is possible to provide an editing effect wherein, while shared objects are used by being shared among a plurality of MHEG scenes, the display is capable of transiting from one scene to another.

In an attempt to carry out editing work for displays of objects like ones shown in FIGS. 16C to 16F given earlier in an authoring tool without introducing the concept of a shared scene, for example, first of all, it is necessary to set objects ob1 and ob2 each as a shared object and, then, to describe a script prescribing that objects ob1 and ob2 are properly placed at positions in MHEG scenes 1 to 4 as shown in FIGS. 16C to 16F respectively.

The editing work shown in FIGS. 17A to 17D is carried out in a similar way. That is to say, first of all, objects ob3 and ob4 are each prescribed as a shared object. Then, it is necessary to prescribe a script including an order of superposition of shared objects ob3 and ob4 for MHEG scene 1 so as to give a display state like the one shown in FIG. 17C. By the same token, it is necessary to prescribe a script including an order of superposition of shared objects ob3 and ob4 for MHEG scene 2 so as to give a display state like the one shown in FIG. 17D.

In order to carry out such editing work, it is necessary for the editor to have sufficient knowledge of a script language that enables the editor to do editing work of shared objects. Thus, a result of the editing work much relies on the skill owned by the editor. For this reason, the editor is capable of creating only a simple scene using shared objects due to, for example, the fact that the editor is capable of describing only a very simple script. In another case, a script is described incorrectly due to the fact that the editor is not familiar with the script language.

The present authoring tools only have the functionality of turning a shared object on and off simultaneously for all scenes. Thus it is difficult to utilize a shared object effectively.

In the case of this embodiment, on the other hand, the editor carries out editing work by, first of all, creating a shared scene using selected objects each as a shared object and, creating an image obtained as a result of superposition of the shared scene on an MHEG scene. As a result, the editing work creates a visual image with ease.

2-3 Configuration of the MHEG Authoring System

Next, the configuration of an MHEG authoring system provided by this embodiment is explained.

As described above, the MHEG authoring system provided by this embodiment is capable of editing MHEG contents defining shared scenes. However, processing carried out by the MHEG authoring tool including the editing work using such a shared scene can be conceptually configured into a typical MHEG authoring tool as shown in FIGS. 18A and 18B.

Processing carried out by the MHEG authoring tool is classified into 2 large categories, namely, editing work shown in FIG. 18A and conversion work shown in FIG. 18B. The editing work is carried out in accordance with an internal format in this MHEG authoring tool to create an MHEG application file or an MHEG content. On the other hand, the conversion work is carried out to convert an MHEG content created by the editing work carried out in accordance with the internal format in this MHEG authoring tool into data of the so-called MHEG-IS format conforming to the actual MHEG specifications.

The MHEG-IS format is the format of an MHEG content with substances conforming to MHEG specifications. In this case, the MHEG-IS format is a format for outputting contents for data broadcasting.

That is to say, the MHEG authoring tool provided by this embodiment has a configuration wherein editing processing is carried out in accordance with an internal format in the MHEG authoring tool, shared scenes and the like which do not exist in the actual MHEG specifications are defined and editing processing using the defined shared scenes and the like can be implemented. Conversely speaking, operations can be typically carried out in a GUI-like interface so as to allow the editor to perform advanced editing by carrying out simpler operations without the need for doing sophisticated work such as writing a script conforming to the MHEG specifications.

It should be noted, however, that the substance of an edit of an MHEG content (that is, a description such as a definition statement) conforming to the internal format of the MHEG authoring tool is valid only in the MHEG authoring tool. Thus, in order to allow the contents of the description conforming to the internal format to be decoded and displayed on the receiver side, it is necessary to convert the contents of the description into a description with contents conforming to the MHEG specifications. Thus, the configuration of MHEG authoring tool is designed to such that the description created by the edit processing according to the internal format as shown in FIG. 18A is converted into a description with contents conforming to the MHEG-IS format by the conversion processing shown in FIG. 18B.

Using the above description as a basis, the following detailed description explains the concept of processing in the MHEG authoring tool provided by this embodiment to do editing work using shared scenes with reference to FIGS. 18A and 18B.

As shown in FIG. 18A, in the MHEG authoring tool, editing work is carried out on an MHEG content comprising 2 scenes, namely, MHEG scene 1 and MHEG scene 2. Three files, namely, shared-object files 1, 2 and 3 are created and prepared each as a shared object that can be used by MHEG scene 1 and MHEG scene 2. Shared-object file 1 is created by using objects 1 and 2 whereas shared-object file 2 is created by using objects 3 and 4. As for creation of shared-object file 3, objects 5 and 6 are used.

Here, assume that the editor edits scenes in an environment of the MHEG authoring tool. In this case, MHEG scene 1 is edited by using shared-scene files 1 and 2 to produce its desired display format whereas MHEG scene 2 is edited by using a shared-scene file 3 to produce its desired display format.

Then, in the MHEG authoring tool, a shared-scene definition statement 1 of shared-scene files 1 and 2 is formed as "authoring control information" in accordance with actual results of the editing for MHEG scene 1 whereas a shared-scene definition statement 2 of shared-scene file 3 is formed as other "authoring control information" in accordance with the actual results of the editing for MHEG scene 2.

Here, the concept of a shared scene is prescribed in the MHEG authoring tool provided by this embodiment. However, the prescription itself is not included in the brief description of the MHEG-IS format. On the other hand, the MHEG-IS system prescribes a description format indicating how individual shared objects are used for each MHEG scene.

For this reason, in the processing to output a result of editing by using a shared scene in the MHEG authoring tool provided by this embodiment as described above, that is, the processing to output a description of authoring control information (or shared-scene definition statements) in the MHEG-IS format, it is necessary to convert the description into description contents of a script (or control information) used in executing control of individual shared-object units in accordance with the MHEG description outline.

Thus, in the MHEG authoring tool provided by this embodiment, the description is converted into an output with the MHEG-IS format as shown in FIG. 18B.

In this conversion, first of all, objects 1 to 6 used in shared-scene files 1, 2 and 3 as shown in the left-hand-side diagram of FIG. 18B are prescribed in an MHEG content (or an MHEG application file) as shared objects 1 to 6 and controlled as a set of shared objects.

Then, for MHEG scene 1, a link for controlling shared objects 1 to 4 is described in a description file which is provided to the MHEG application file as shown in the right-hand-side diagram of FIG. 18B.

By the same token, for MHEG scene 2, a link for controlling shared objects 5 and 6 is described in a description file which is provided to the MHEG application file.

Then, the MHEG application file converted into the MHEG-IS format as described above is output as a content for a data broadcast multiplexed in a digital satellite broadcast. If the configuration of the ground station 1 shown in FIG. 5 is taken as an example, the MHEG application file converted into the MHEG-IS format is data output from the MHEG authoring tool 42 to the DSM-CC encoder 44.

In the reception facility 3, for example, the digital satellite broadcast with the content for a data broadcast multiplexed therein is received by the IRD 12 and subjected to processing such as an MHEG decoding process in the CPU 80 so as to allow the display of a GUI screen to be controlled in accordance with the MHEG system.

The MHEG contents of the MHEG scenes shown in FIGS. 16A to 16F are edited by using the MHEG authoring tool shown in FIGS. 18A and 18B and broadcasted as a data broadcast. In this case, the IRD 12 outputs and displays an MHEG picture in display formats as shown in FIGS. 16C to 16F.

Figure 19:
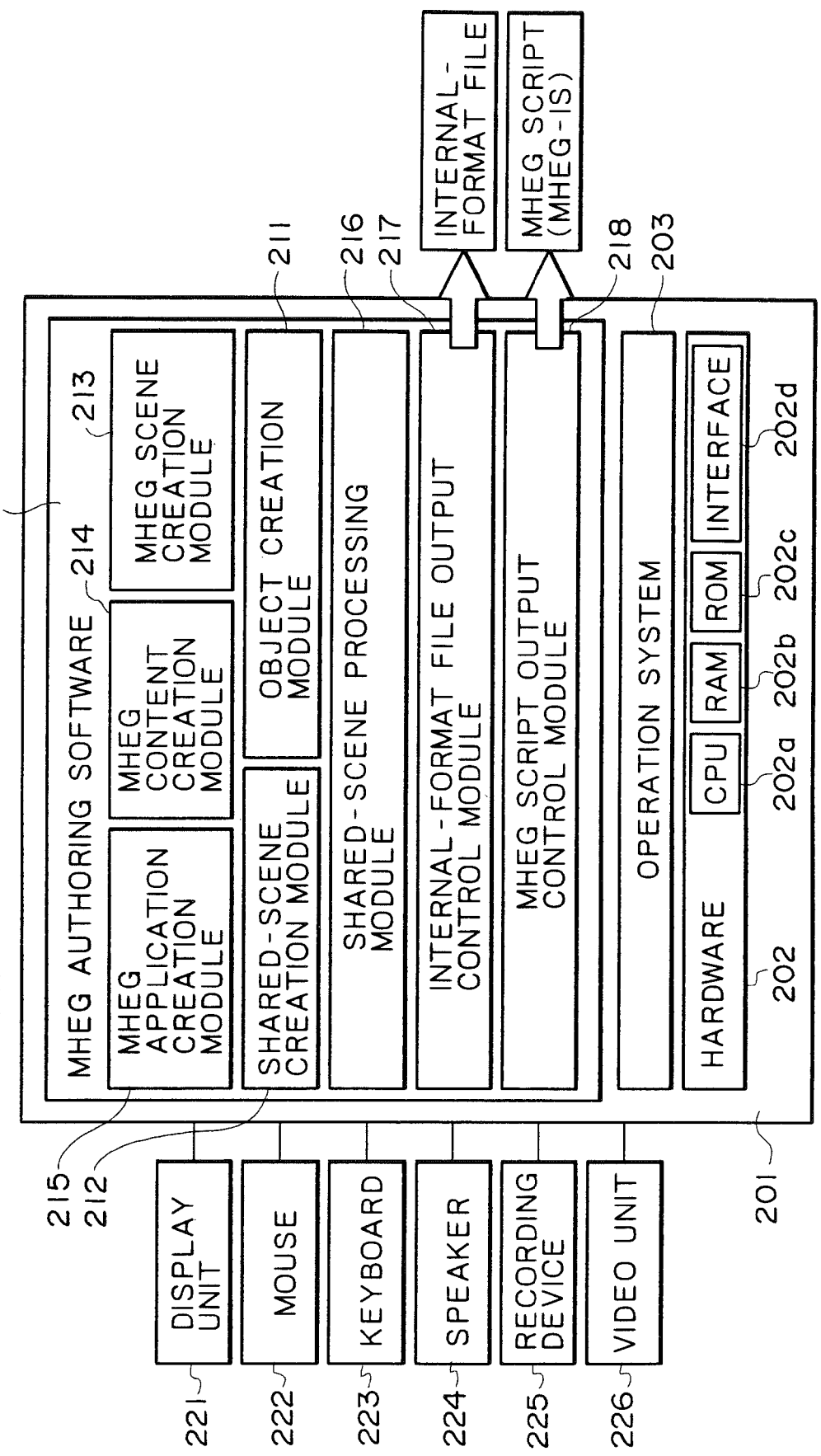
FIG. 19 is a block diagram showing functions of the MHEG authoring tool provided by the embodiment.

FIG. 19 is a diagram showing a typical actual configuration of the MHEG authoring tool provided by this embodiment.

In actuality, the MHEG authoring tool 42 typically comprises a personal computer 201 and MHEG authoring software 210 activated in the personal computer 201.

As shown in the figure, the personal computer 201 of the MHEG authoring tool 42 physically includes hardware 202.

The hardware 202 comprises a CPU (Central Processing Unit) 202*a*, a RAM (Random-Access Memory) 202*b*, a ROM 202*c* and an interface 202*d*. The CPU 202*a* executes various kinds of control and carries out a variety of operations. The RAM 202*b* is used for storing information such as an application program executed by the CPU 202*a* and data generated as a result of processing carried out by the CPU 202*a*. The ROM 202*c* is used for storing information required for operations of the personal computer 201. The interface 202*d* is provided for facilitating exchanges of information between the hardware 202 and external equipment and external operation units to be described later.

It should be noted that the hardware 202 may include a variety of other devices.

A basic program is executed on this hardware 202 as an operating system 203 to provide an environment that allows MHEG authoring software of this embodiment to be executed.

The external equipment and the external operation units connected to the personal computer 201 shown in the figure include a display unit 221, a mouse 222, a keyboard 223, a speaker 224, a storage device 225 and a video unit 226.

The display unit 221 displays a picture output by the personal computer 201. Specifically, in this embodiment, a GUI screen for editing work using the MHEG authoring software 210 to be described later is also displayed.

The mouse 222 and the keyboard 223 each serve as an operator unit used by the editor for entering operation information to the personal computer 201.

The speaker 224 is provided for outputting an audio signal generated by the personal computer 201 to the outside.

The storage device 225 stores information required by the personal computer 201. Examples of such information are the operating system 203 and predetermined application software including the MHEG authoring software 210 provided by this embodiment. In the case of this embodiment, the stored information also includes MHEG contents themselves and objects used for forming each of the MHEG contents such as picture files, sound files and text files. The MHEG authoring software 210 is executed to create files of these objects to be stored in the storage device 225 and to carry out editing work by using the files of these objects.

It should be noted that, it is desirable to use a storage unit capable of accommodating a relatively large amount of data as the storage device 225, for example, a hard-disc drive.

A typical video unit 226 is a VTR which is capable of recording and playing back video information onto and from a video tape or a video disc.

An example of an MHEG content is a scene change synchronized with a broadcast program comprising pictures and sounds. In processing to edit an MHEG content synchronized with such a broadcast program, the video unit 226 can be used typically for playing back the broadcast program comprising pictures and sounds.

Next, the MHEG authoring software 210 is explained.

As described earlier, the MHEG authoring software 210 is an application software operating on the personal computer 201. The program is stored in the storage device 225.

After being read out from the storage device 225 for activation as a program, the MHEG authoring software 210 can be represented as functional blocks shown in the figure.

It should be noted that, the MHEG authoring software 210 has a configuration (not shown) in which information is exchanged between the functional blocks to allow required functions of the MHEG authoring software 210 to be executed.

In the MHEG authoring software 210, an object creation module 211 is a functional block comprising programs used for creating a file used as an object. For example, the editor may use the keyboard 223, the mouse 222 and other components in conjunction with the programs of the object creation module 211 or a GUI screen displayed on the display unit 221 to create a file used as an object. If the object created is a picture, for example, the editor is capable of creating the object by rendering a picture file using functions of the object creation module 211. In addition to a picture file, according to the prescription, the created object may be a text file or a sound file. In this case, of course, the object creation module 211 can be used for forming a text or sound file. An object file created by using the object creation module 211 can be stored and retained in the storage device 225.

A shared-scene creation module 212 comprises programs for creating a shared scene by utilizing object files created by using the object creation module 211.

In this case, for example, the editor is capable of creating any arbitrary number of shared scenes as long as the number is smaller than an upper limit prescribed by the MHEG authoring software 210. Much like an object file, a shared scene is created by operating the keyboard 223, the mouse 222 and other components which are used in conjunction with the programs of the shared-scene creation unit 212 to select any arbitrary number of object files created so far.

An MHEG-scene creation module 213 is a functional block comprising programs used for creating an MHEG scene. The programs of the MHEG-scene creation module 213 are used for selecting an object file created by using the object creation module 211 and the selected object file is used for creating an MHEG scene.

Programs of a shared-scene processing module 216 are executed to perform processing to edit a relation between an MHEG scene and a shared scene in accordance with an operation carried out by the editor for the GUI screen thereof. Specifically, the shared-scene processing module 216 is programmed for editing work such as setting a shared scene on an MHEG scene as shown in FIGS. 16A to 16F and specifying an order of superposing a plurality of shared scenes to be used on an MHEG scene as shown in FIGS. 17A to 17D.

Details of an MHEG content creation module 214 are not explained. Briefly speaking, the MHEG content creation module 214 is used for creating a scenario explained earlier by referring to FIG. 14 in accordance with a result of editing predetermined contents of typically a scene.

The MHEG-application creation module 215 integrates results of editing work carried out by using the object creation module 211, the shared-scene creation module 212, the MHEG-scene creation module 213, the MHEG content creation module 214 and the shared-scene processing module 216 described so far to create an MHEG-application file (or an MHEG content) controlled in accordance with an internal format. In order to implement this function, in the MHEG-application creation module 215 provided by this embodiment, a description file containing "authoring control information" also shown earlier in FIG. 18A is generated and the MHEG content is controlled in accordance with the internal format. Here, the authoring control information also includes a shared-scene definition statement created on the basis of an editing result produced by the shared-scene processing module 216 and a description file of a scenario created by using the MHEG content creation module 214. In addition, transitions among scenes can also be controlled in accordance with the internal format by using the authoring control information described by using the MHEG-application creation module 215.

Furthermore, control information for the synchronization of a scene output in the broadcasting time of a broadcast program is also described as authoring control information. When the authoring control information is converted into the MHEG-IS format, the contents of the description of the control information for synchronization are also converted and output.

Information obtained as an MHEG content created by using the MHEG-application creation module 215 as described above is handled in accordance with an internal format by the MHEG authoring software as explained earlier by referring to FIGS. 18A and 18B.

Then, in this embodiment, an MHEG application file created in accordance with the internal format can be output to the external by processing carried out by an internal-format-file output control module 217 as an internal-format file with the internal format remaining unchanged as it is.

For example, an internal-format file of an MHEG application output by the internal-format-file output control module 217 can be stored and retained in the storage device 225. By doing so, the internal-format file stored in the storage device 225 can be transferred later to the personal computer 201 which is capable of changing editing contents by execution of the MHEG authoring software 210.

An MHEG-script output control module 218 receives data of an MHEG-application file created by the MHEG-application creation module 215 in the internal format, converts the data into a description of a script (or control information) conforming to the actual MHEG specifications and outputs, outputting the description to the external. That is to say, the MHEG-script output control module 218 outputs a regular MHEG (MHEG-IS) application file.

Typically, the output of the MHEG-script output control module 218 is supplied to the DSM-CC encoder 44 shown in FIG. 5.

It should be noted that an MHEG application file of the MHEG-IS format produced by the MHEG-script output control module 218 can be stored and retained in the storage device 225. In actuality, an application file of the MHEG-IS format stored and retained in the storage device 225 is supplied to the DSM-CC encoder 44 employed in the ground station 1 when required.

In comprising the configuration of the MHEG authoring software explained so far with the processing shown in FIGS. 18A and 18B, the functional circuit blocks of the software correspond to the processing according to the internal format of the MHEG authoring tool shown in FIG. 18A. As described earlier, the functional circuit blocks are the object creation module 211, the shared-scene creation module 212, the MHEG scene creation module 213, the MHEG content creation module 214, the MHEG application creation module 215, the shared-scene processing module 216 and the internal-format file output control module 217.

In addition, the object creation module 211 corresponds to the processing shown in FIG. 18B to convert MHEG application information expressed in the internal format into an MHEG-IS output.

2-4 Typical GUI Screens Displayed as Part of MHEG Authoring Software

As described above, the MHEG authoring software 210 provided by this embodiment is application software running on the personal computer 201. The MHEG authoring software 210 is also capable of carrying out command-line editing typically for describing a script conforming to the MHEG specifications. In order to allow a variety of editing operations to be carried out as visually as possible, mainly including the editing of a shared scene described earlier, the MHEG authoring software 210 has an operation style embracing the GUI. That is to say, much like various kinds of software developed in recent years for personal computers, the MHEG authoring software 210 allows the editor to carry out editing operations by operating the mouse 222 and the keyboard 223 while looking at an operation screen appearing on the display unit 212.

It should be noted that an operation on an interface such as the GUI can be implemented with ease by typically carrying out edit processing according to the internal format in the MHEG authoring software 210 as described earlier.

Figure 20:
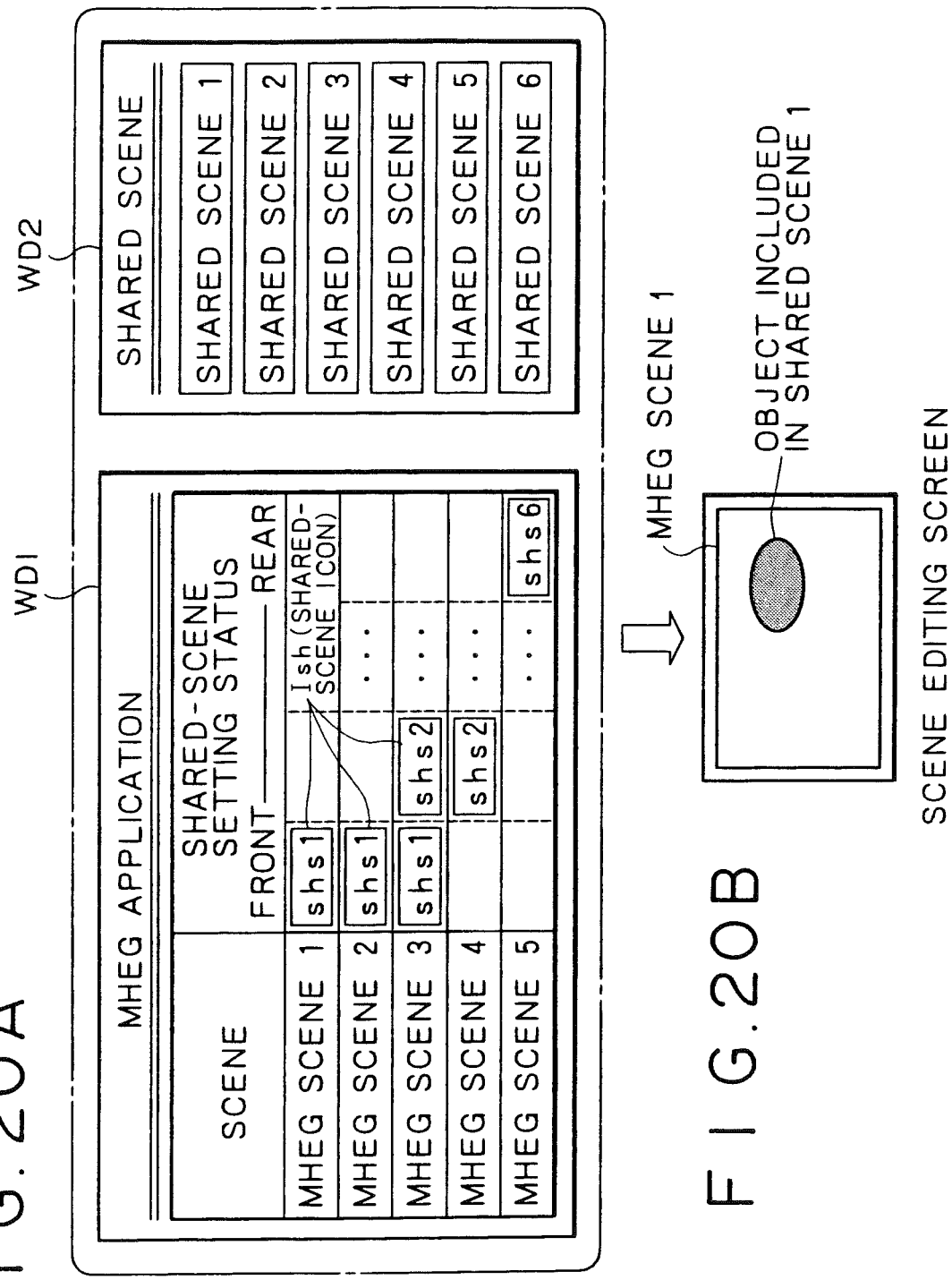
FIGS. 20A and 20B are explanatory diagrams showing a typical display format of an operation screen implemented by MHEG authoring software provided by the embodiment.

FIGS. 20A and 20B are diagrams showing a typical display format of a GUI screen for editing operations carried out by using the MHEG authoring software 210 provided by this embodiment. In particular, the figure shows a GUI screen related to shared-scene editing which is a characteristic of this embodiment.

In particular, FIG. 20A is a diagram showing a typical basic display format of a GUI screen for creating an MHEG application file. The picture of the GUI screen is displayed typically on the display unit 221.

As shown in FIG. 20A, the screen displays an MHEG application window WD1 and a shared-scene control window WD2.

The MHEG application window WD1 is a window for visually displaying the structure of an MHEG application created by the editor. For example, the window has a title of "MHEG Application".

In the first place, on the left side of the MHEG application window WD1, a column with a title of "Scene" is displayed for presenting a list of MHEG scenes constituting this MHEG application. In this example, the scene column displays 5 MHEG scenes, namely MHEG scenes 1 to 5.

It should be noted that, in case there are too many MHEG scenes constituting the MHEG application so that all the MHEG scenes can not be accommodated in the display area of the MHEG application window WD1, the MHEG application window WD1 can be displayed, for example, in a format that allows the window to be scrolled.

In the second place, on the right side of the MHEG application window WD1, a column with a title of "Shared-Scene Setting Status" is displayed for visually displaying the present setting status of the MHEG scenes. The setting status of an MHEG scene shows which shared scenes are used and, if a plurality of shared scenes are in use, the status specifies what order the shared scenes are to be superposed in.

On the "Shared-Scene Setting Status" column, 1 shared scene is expressed by an icon which is referred to as a shared-scene icon Ish. A shared-scene icon Ish is denoted by notation shsN where N is a natural number, that is, a positive integer denoting the number of a file of the shared scene.

Take MHEG scene 1 as an example. In this case, the status shows that only one shared-scene icon Ish marked with "shs1" is displayed to indicate that only shared scene 1 is used to create MHEG scene 1. Likewise, in the case of MHEG scene 2, only shared scene 1 is used to create MHEG scene 2.

Similarly, in the case of MHEG scene 4, the status shows that only one shared-scene icon Ish marked with "shs2" is displayed to indicate that only shared scene 2 is used to create MHEG scene 4. By the same token, in the case of MHEG scene 5, the status shows that only one shared-scene icon Ish marked with "shs6" is displayed to indicate that only shared scene 6 is used to create MHEG scene 5.

In the case of MHEG scene 3, on the other hand, the status shows that two shared-scene icons Ish marked with "shs1" and "shs2" are set to indicate that two shared scenes 1 and 2 are used to create MHEG scene 5. The fact that shared scene 1 is placed first on the row to be followed by shared scene 2 indicates that shared scene 1 denoted by shs1 is to be displayed first on MHEG scene 3 to be followed by shared scene 2 denoted by shs2. That is to say, the status specifies an order of superposition in which shared scene 1 is placed on the front side and shared scene 2 is placed on the rear side.

As described above, the shared-scene control window WD2 is displayed on the right side adjacent the MHEG application window WD1.

The shared-scene control window WD2 has a title of "Shared Scenes" to indicate that this window shows a list of shared scenes created and prepared by the editor. In this example, the shared-scene control window WD2 presently displays 6 shared scenes, namely, shared scenes 1 to 6.

The shared scenes set on the "Shared-Scene Setting Status" column of the MHEG application window WD1 described above for each MHEG scene are selected arbitrarily from the shared scenes on the list displayed on the shared-scene control window WD2.

There are a variety of possible operations to select a shared scene from the list. In an example of the possible operations, a shared scene arbitrarily selected from the list on the shared-scene control window WD2 is moved to the position of a shared-scene icon for any arbitrary MHEG scene on the "Shared-Scene Setting Status" column on the MHEG application window WD1 by carrying out a drag-and-drop operation.

In addition, the specification of an order of superposition for an MHEG scene on the "Shared-Scene Setting Status" column on the MHEG application window WD1 can be changed by carrying out a drag-and-drop operation cited above.

Assume for example that, with the screen of FIG. 20A displayed, any arbitrary one of MHEG scenes 1 to 5 is selected by using typically a pull-down menu which is not shown in the figure. Then, a predetermined operation is carried out to call an edit screen (or a window) for the selected MHEG scene. FIG. 20B is a diagram showing a typical scene edit screen.

Assume for example that the scene edit screen shown in FIG. 20B is a screen for MHEG scene 1. In this case, the scene edit screen displays the picture of MHEG scene 1 which uses shared scene 1. In this figure, an object included in shared scene 1 is shown as a hatched ellipse.

2-5 Processing Operations

The following description explains a variety of processing operations carried out by a CPU 202a employed in the hardware 202 shown in FIG. 19 by execution of the MHEG authoring software 210 provided by this embodiment. The processing operations are exemplified by processing to edit a shared scene which is a characteristic of the embodiment.

Figure 21:
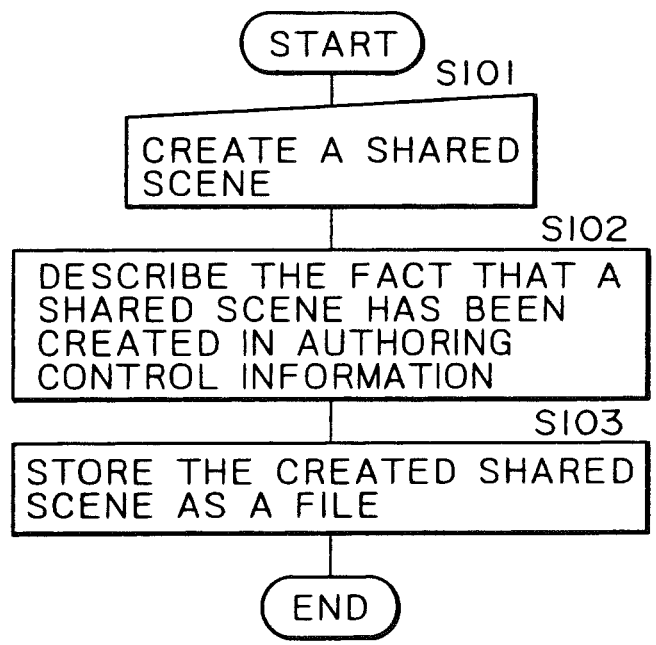
FIG. 21 is a flowchart representing processing operations carried out to create a shared scene.

FIG. 21 is a flowchart showing processing operations carried out to create a shared scene. The operations are carried out by execution of programs of mainly the shared-scene creation module 212 and the MHEG-application creation module 215 included in the MHEG authoring software 210.

As shown in the figure, the processing begins with step S101 at which a shared scene is created in accordance with operations carried out by the editor.

In order to create a shared scene, a shared scene creation screen is presented as a GUI screen in a format like a typical one shown in FIG. 20B. The editor then creates a picture to be used as a shared scene by pasting objects selected arbitrarily from already prepared objects such as picture and text files on the shared-scene creation screen.

At step S101, display control processing is carried out to change the appearance of the GUI screen in accordance with such an operation to create a shared scene described above. In addition, an operation to create a shared scene also causes information on a temporary shared scene to be controlled in accordance with an internal format.

In this embodiment, a variety of editing results for an MHEG application typically including shared scenes are controlled in the MHEG-application creation module 215 by being described as authoring control information according to the internal format.

Then, at step S102, a description according to contents of the shared scene created at step S101 is written as the authoring control information according to the internal format.

Subsequently, at step S103, the shared scene created at step S101 is controlled as a file and stored and retained in the storage device 225. It should be noted, however, that information contained in the stored file of the shared scene also conforms to the internal format.

The processing up to this point is carried out to create a certain shared scene which can be stored as a file conforming to the internal format. Then, this procedure (or processing) is carried out for each shared scene so as to allow shared-scene files required for creation of an MHEG scene to be prepared. It should be noted that a directory of shared-scene files stored in this way is controlled as authoring control information in the MHEG-application creation module 215.

Figure 22:
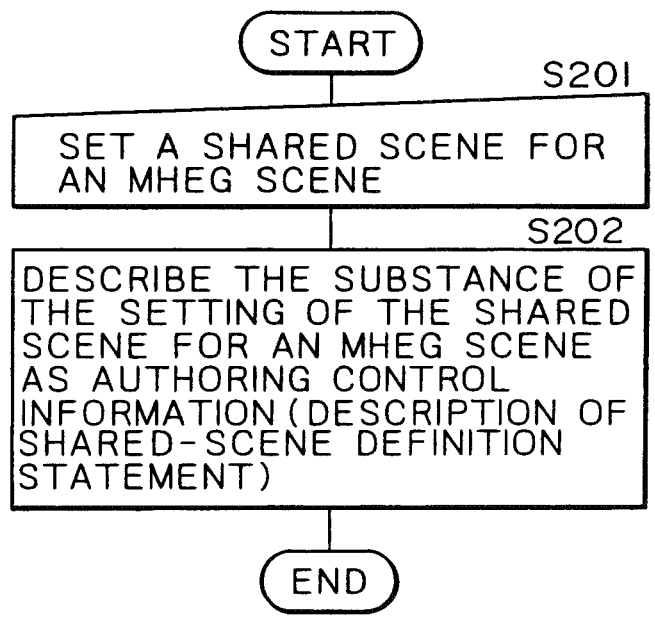
FIG. 22 is a flowchart representing processing operations carried out to set a shared scene for an MHEG scene.

FIG. 22 is a diagram showing processing operations to set a shared scene for an MHEG scene. The operations are carried out by execution of programs of mainly the shared-scene processing module 216 and the MHEG-application creation module 215.

At a stage prior to the processing shown in FIG. 22, MHEG scenes and shared scenes are prepared to create the MHEG content. It should be noted that the creation of an MHEG scene itself is not described before. The creation of an MHEG scene is implemented by displaying the MHEG-scene creation screen and having the editor create the MHEG scene on the screen using the MHEG-scene creation module 213.

As shown in FIG. 22, the processing begins with step S201 at which processing to set shared scenes for each MHEG scene is carried out in accordance with an operation performed by the editor.

That is to say, in accordance with an operation to set shared scenes for an MHEG scene as described earlier, processing is carried out, for among other purposes, to output a GUI picture like the one shown in FIGS. 20A and 20B as a result of editing. In the operation to set shared scenes for an MHEG scene, shared scenes to be used for the MHEG scene and an order of superposition of the shared scenes are specified.

Then, when shared scenes are set for a certain MHEG scene as described above, the setting of the shared scenes for the MHEG scene is described as authoring control information at step S202. To put it concretely, a shared-scene definition statement explained earlier by referring to FIGS. 18A and 18B is created.

In actuality, the processing shown in FIG. 22 is carried out for each MHEG scene. Then, the setting of shared scenes for each MHEG scene obtained as a result of operations carried out by the editor during such processing is described by the MHEG-application creation module 215 as authoring control information.

The steps of processing shown in FIGS. 21 and 22 are thus processing carried out by execution of the MHEG authoring software 210 in accordance with an internal format to edit an MHEG application provided by this embodiment by creation of shared scenes and setting the shared scenes for each MHEG scene.

It should be noted that authoring control information created in the steps shown in FIGS. 21 and 22 can be stored in the storage device 225 as information on an MHEG application according to the internal format along with typically a variety of files used mainly as objects through processing of the internal-format-file output control module 217. It is worth noting, however, that operations of the processing of the internal-format-file output control module 217 are not shown explicitly in FIGS. 21 and 22.

In order to output the MHEG application conforming to the internal format as described above as a data content for broadcasting, that is, in order to output content information controlled by authoring control information as a broadcasting data content, it is necessary to convert the format of the MHEG application into an MHEG-IS format as has been described earlier by referring to FIGS. 18A and 18B. In the following description, description contents of a script conforming to the MHEG-IS format is referred to as an MHEG-IS script. The following description explains processing to convert information on an MHEG application from the internal format into the MHEG-IS format of an MHEG script with reference to FIGS. 23 and 24. This conversion processing is carried out in an environment where the MHEG authoring software 210 is executed.

It should be noted, however, that the explanation of the conversion processing is limited in this case to a shared scene or a shared object which is a characteristic of this embodiment.

In addition, the processing described below is carried out by executing programs of the MHEG-script output control module 218.

Figure 23:
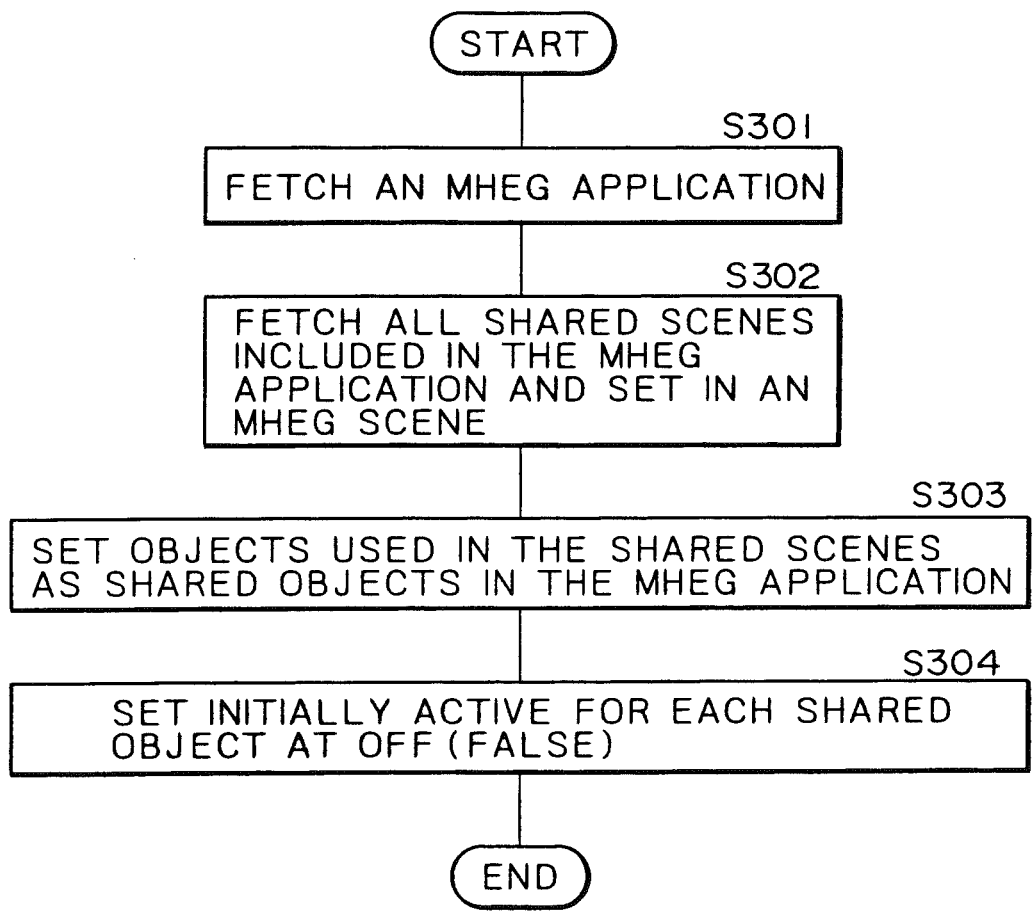
FIG. 23 is a flowchart representing processing operations carried out to output shared scene setting data as an MHEG script.
Figure 24:
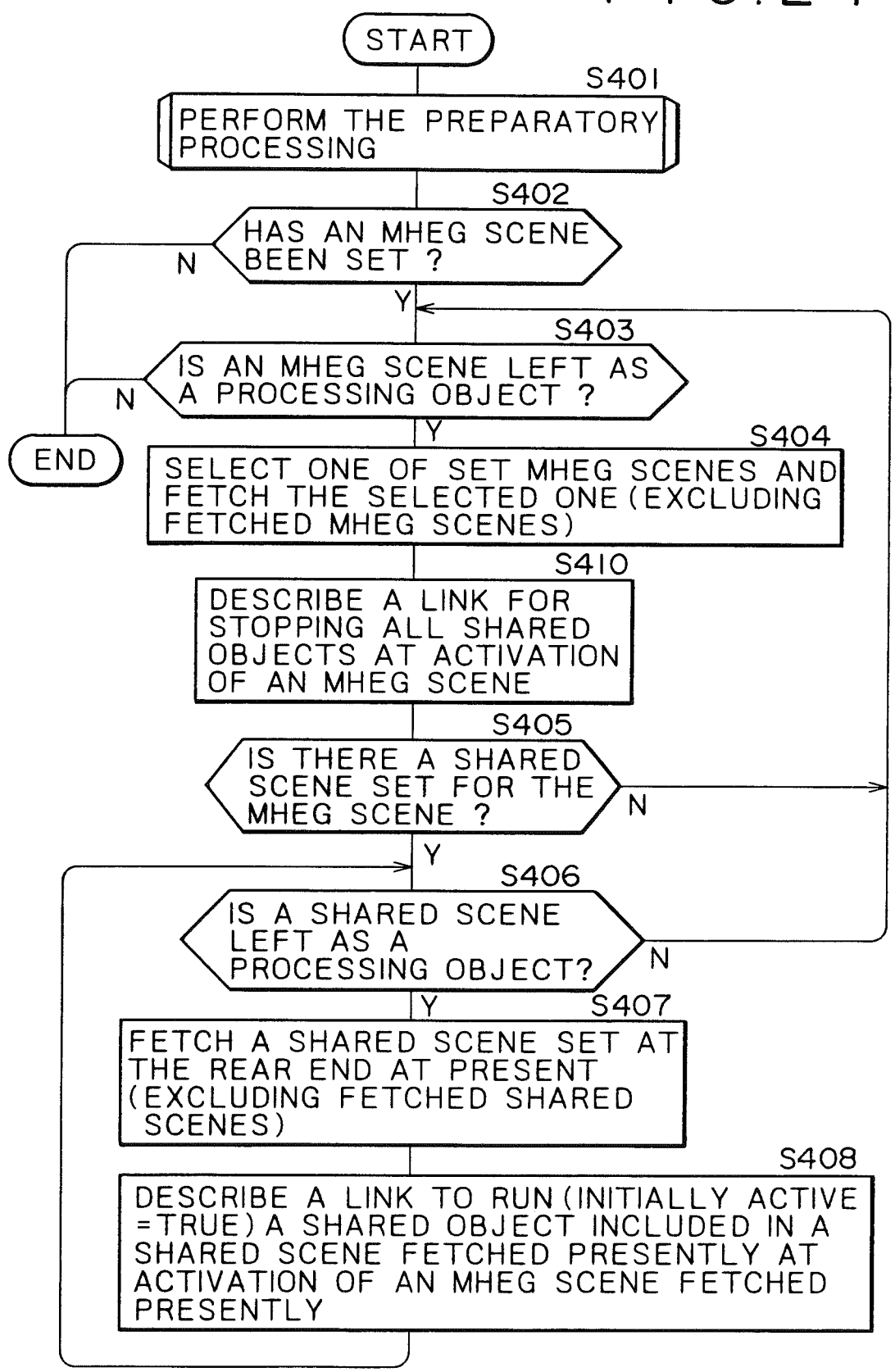
FIG. 24 is a flowchart representing processing operations carried out to output shared scene setting data as an MHEG script.

FIG. 23 is a diagram showing preparatory processing to output a result of editing a shared scene as an MHEG script. Typically, after this preparatory processing is completed, the conversion processing shown in FIG. 24 is actually carried out to produce an MHEG script.

As shown in FIG. 23, the processing begins with a step S301 to fetch information on an MHEG application described in the internal format of the MHEG authoring software 210. Shared objects are controlled in authoring control information as objects forming a shared scene.

Then, at next step S302, the contents of the MHEG application fetched at step S301 are analyzed to acquire all shared scenes which are included in this MHEG application and set for use in MHEG scenes of the MHEG application.

Subsequently, at step S303, processing is carried out to set all the objects used in the shared scenes obtained at step S302 in the MHEG application (or the MHEG script) as shared objects.

To put it concretely, the following MHEG script is described in this processing.

In the MHEG script, a shared object is defined by a description of a "Shared" parameter which represents an attribute of the object as follows.

Shared=True indicates that the object is prescribed as a shared object.

On the other hand,

Shared=False indicates that the object is prescribed to be not a shared object.

Thus, at step S303, the attribute of each object used in the shared scenes obtained at the step S302 is described as follows:

Shared=True

By describing the attribute in this way, all the objects are each treated as a shared object.

Another parameter of an object, Initially Active is defined as a parameter set to indicate whether the object is active or inactive in an initial state in an MHEG scene or an MHEG application.

Initially Active=True indicates that the object is active initially.

On the other hand,

Initially Active=False indicates that the object is inactive initially.

Finally, at step S304, for each of the shared objects set at step S303, this parameter is set as follows.

Initially Active=False

That is to say, each of the shared objects is inactive initially.

Next, processing shown in FIG. 24 is explained.

As shown in the figure, the processing begins with step S401 at which the preparatory processing explained earlier by referring to FIG. 23 is carried out.

When the preparatory processing is completed, the processing flow goes on to step S402.

At step S402, a fetched MHEG application is examined to determine whether or not one or more MHEG scenes are set and used in the MHEG application. Typically, the judgment is formed by referring to authoring control information conforming to the internal format.

If it is determined that MHEG scenes to be used are not set in the MHEG application, no processing is specially required for shared scenes and, the processing is ended. If it is determined that MHEG scenes to be used are set in the MHEG application, on the other hand, the flow of the processing goes on to step S403.

At step S403, the MHEG application is checked to determine whether or not there is still an unselected MHEG scene which remains to be subjected to convert a shared scene into a shared object. Thus, when the flow goes on from step S402 to step S403 for the first time, the determination formed ate step S403 certainly indicates that there is an MHEG scene to be subjected to such conversion processing. In this case, the flow of the processing proceeds to step S404.

At step S404, one of presently set MHEG scenes is selected and the authoring control information of the selected MHEG scene is fetched as an object of processing. Typically, an MHEG scene is selected sequentially according to an MHEG-scene sequence number.

It should be noted that MHEG scenes once selected before at step S404 are no longer subjected to the subsequent processing.

At step S405, a link is described as an MHEG script to indicate that all shared objects are to be stopped (turned off) at activation of this MHEG scene. To put it concretely, for all shared objects included in the MHEG application, an MHEG script regarding shared objects for this MHEG scene is described as follows:

Initially Active=False

The prescription obtained as an actual editing result thus indicates that, in this MHEG scene, shared objects are not used at all.

At step S406, the authoring control information (or shared-scene definition statements) of the selected MHEG scene fetched at step S404 is referred to in order to determine whether or not there is a shared scene set for the MHEG scene.

If it is determined that there is no shared scene set for the MHEG scene, the flow of the processing goes back to step S403.

If it is determined S406 indicated that there is a shared scene set for the MHEG scene, on the other hand, the flow of the processing goes on to step S407.

At step S407, the MHEG scene is checked to determine whether or not there is still an unselected shared scene which remains to be processed to convert the shared scene into a shared object. Thus, when the flow goes on from step S405 to step S406 for the first time, it has been determined at step S407 that there is a shared scene to be subjected to such conversion processing. In this case, the flow of the processing proceeds to step S408.

At step S408, one of unselected MHEG scenes remaining as an object of the conversion processing is selected. To put it in detail, processing is carried out to select and fetch the description contents such as a shared-scene definition statement on a shared scene which has been placed at the rearmost end.

It should be noted that shared scenes once selected before at step S408 are no longer subjected to the subsequent processing.

Next, at step S409, processing is carried out to describe a link as an MHEG script to run or turn on shared objects included in the shared scene fetched at step S408 at activation of the MHEG scene fetched at step S404 as a current processing object. In order to describe a link to run shared objects, typically, the following is described for each of the shared objects.

If initially Active=True, the MHEG script prescribes that the shared objects serving as a material of the shared scene fetched at step S408 be put in an active state at activation of the MHEG scene and displayed at proper positions on the display screen.

As the processing of step S409 is completed, the flow goes back to step S407. If determination formed ate step S407 indicates that there is a shared scene to be subjected to such conversion processing, the flow of the processing proceeds to step S408 to carry out the processing of step S408 and the subsequent processing.

The pieces of processing of steps S407 to S409 are carried out repeatedly for a selected and fetched MHEG scene as many times as the number of shared scenes set for the MHEG scene.

By carrying out steps S407 to S409 repeatedly, it is possible to obtain description contents of an MHEG script specifying utilization of shared objects in a certain MHEG scene in accordance with results of work carried out earlier by the editor to edit shared scenes. At the same time, it is also possible to obtain description contents of an MHEG script specifying an order of superposition of the shared objects.

As described above, steps S407 to S409 are carried out repeatedly for an MHEG scene as many times as the number of shared scenes set for the MHEG scene. When no more shared scenes remain, the flow of the processing goes back to step S403.

When the flow of the processing returns to step S403 from step S409 or S406 and it is determined in step S403 that there is an MHEG scene left as an object of the conversion processing, the flow goes on to step S404 to carry out the processing of step 404 and the subsequent processing.

Thus, steps S403 to S409 are carried out repeatedly for an MHEG application file (or an MHEG content) as many times as the number of MHEG scenes created for the MHEG content.

After steps S403 to S409 have been completed, step S403 indicates that the processing is ended.

In this way, at the stage the processing carried out so far is ended, an internal-format result of editing work performed by using the MHEG authoring software in accordance with operations carried out by the editor has been converted into description contents of an MHEG script conforming to the MHEG-IS format.

It should be noted that FIGS. 23 and 24 show the processing of the MHEG-script output control module 218 to convert the internal format of a description of an MHEG content into the MHEG-IS format.

Thus, in actuality, processing to convert the internal format into the MHEG-IS format for an editing result of an MHEG content other than the shared scene is carried out concurrently with the processing shown in FIGS. 23 and 24.

In addition, the pieces of processing shown in FIGS. 23 and 24 are each typical processing to the bitter end. There are other conceivable processing procedures for converting description contents with the internal format of the MHEG authoring software using the concept of shared scenes into description contents with the MHEG-IS format based on the concept of shared objects.

The above embodiment is exemplified by a case in the digital satellite broadcasting system created in accordance with the MHEG specifications. In addition, a content created by the present invention can also be used in media other than the digital satellite broadcasting system. As for the media, a recording medium such as a CD-ROM can also be used in addition to distribution through a broadcasting system and a network.

Furthermore, while the embodiment is exemplified by a case in which an MHEG content is edited, the present invention can also be applied to applications other than the MHEG system provided that the other applications conform to specifications for creating an interface picture (a content) introducing a concept similar to, for example, the concept of a shared object.

As described above, the present invention defines a shared scene that can be created by using any arbitrary objects as a virtual scene usable as a scene common to scenes instead of directly handling the shared object on an authoring tool in editing work to create a content conforming to typically the MHEG specifications. In addition, the present invention is used for editing scenes in shared-scene units. Then, the edited work using the shared scene is finally converted into description contents for controlling a shared object itself in accordance with specifications for a content for broadcasting.

With such a configuration, an editor creating a content is capable of handing a shared object by carrying out operations to combine shared scenes created arbitrarily for a scene at an editing-operation stage using the authoring tool. Conversely speaking, it is not necessary for the editor to have advance knowledge of the MHEG script.

Thus, by virtue of the present invention, the editor is capable of editing a scene using a shared object with ease and with a high degree of accuracy even if the editor is not familiar with rules of an MHEG script, for example. As a result, the present invention provides an effect to give the editor a capability of creating a scene in a number of display formats through editing operations which are easy to understand.

In addition, as described above, the present invention provides a system of editing operations in which a shared object is handled for each shared scene and, in addition, an order of superposition of shared scenes can be specified. As a result, it is possible to simplify a comparatively complicated edit operation of specifying an order of superposition of objects.

The invention claimed is:

1. A receiving apparatus allowing display of final superimposed scenes from content information according to a predetermined specification, the receiving apparatus comprising:

a receiver adapted to receive a shared object control information used for forming final superimposed scenes that are formed by combining two or more shared scenes and that include arbitrary objects, wherein the shared scenes are the virtual scenes which are created by using two or more arbitrary objects;

the shared object control information being formed from control information described in accordance with an internal format based on the two or more shared scenes, the two or more shared scenes being virtual scenes formed of individual graphical user interface screens in accordance with the internal format and used to form the final superimposed scenes, the final superimposed scenes being formed by superimposition of the individual graphical user interface screens of the two or more shared scenes, each of the individual graphical user interface screens of the two or more shared scenes including two or more of the arbitrary objects, the arbitrary objects being user-selectable command objects that are separately controllable independent of the shared scenes in which the arbitrary objects are displayed in accordance with the predetermined specification; and a processor comprising instructions for processing the shared object control information to form the final superimposed scenes in which the shared objects are specified for display at the same time in the final superimposed scenes in accordance with the predetermined specification, wherein the superimposed final scenes are described by the combination of the individual graphical user interface screens of the two or more shared scenes and one or more of the shared objects based on the internal format, and the control information is described based on one or more of the shared objects without the shared scenes.

2. A receiving apparatus according to claim 1, wherein the object control information specifies a state of utilization of shared objects in each of the final superimposed scenes in accordance with an order of superposition of the individual graphical user interface screens of the two or more shared scenes.

3. A receiving apparatus according to claim 1, wherein the predetermined specification comprises a predetermined broadcasting specification.

4. A non-transitory storage device stored therein instruction, when implemented by a personal computer allowing display of final superimposed scenes from content information according to a predetermined specification, comprising:

receiving a shared object control information used for forming final superimposed scenes that are formed by combining two or more shared scenes and that include arbitrary objects, wherein the shared scenes are the virtual scenes which are created by using two or more arbitrary objects;

the shared object control information being formed from control information described in accordance with an internal format based on the two or more shared scenes, the two or more shared scenes being virtual scenes formed of individual graphical user interface screens in accordance with the internal format and used to form the final superimposed scenes, the final superimposed scenes being formed by superimposition of the individual graphical user interface screens of the two or more shared scenes, each of the individual graphical user interface screens of the two or more shared scenes including two or more of the arbitrary objects, the arbitrary objects being user-selectable command objects that are separately controllable independent of the shared scenes in which the arbitrary objects are displayed in accordance with the predetermined specification; and processing the shared object control information to form the final superimposed scenes in which the shared objects are specified for display at the same time in the final superimposed scenes in accordance with the predetermined specification, wherein the superimposed final scenes are described by the combination of the individual graphical user interface screens of the two or more shared scenes and one or more of the shared objects based on the internal format, and the control information is described based on one or more of the shared objects without the shared scenes.

5. A receiving non-transitory storage device according to claim 4, wherein the predetermined specification comprises a predetermined broadcasting specification.

6. A receiving non-transitory storage device according to claim 4, wherein the object control information specifies a state of utilization of shared objects in each of the final superimposed scenes in accordance with an order of superposition of the individual graphical user interface screens of the two or more shared scenes.

7. A method of processing information received at a receiving apparatus comprising a receiver and processor programmed to allow the display of final superimposed scenes from content information according to a predetermined specification, the method comprising:

receiving, at a receiver, a shared object control information used for forming final superimposed scenes that are formed by combining two or more shared scenes and that include arbitrary objects, wherein the shared scenes are the virtual scenes which are created by using two or more arbitrary objects;

the shared object control information being formed from control information described in accordance with an internal format based on the two or more shared scenes, the two or more shared scenes being virtual scenes formed of individual graphical user interface screens in accordance with the internal format and used to form the final superimposed scenes, the final superimposed scenes being formed by superimposition of the individual graphical user interface screens of the two or more shared scenes, each of the individual graphical user interface screens of the two or more shared scenes including two or more of the arbitrary objects, the arbitrary objects being user-selectable command objects that are separately controllable independent of the shared scenes in which the arbitrary objects are displayed in accordance with the predetermined specification; and processing, at the receiver, the shared object control information to form the final superimposed scenes in which the shared objects are specified for display at the same time in the final superimposed scenes in accordance with the predetermined specification, wherein the superimposed final scenes are described by the combination of the individual graphical user interface screens of the two or more shared scenes and one or more of the shared objects based on the internal format, and the control information is described based on one or more of the shared objects without the shared scenes.

8. A method according to claim 7, further comprising controlling utilization of the at least one shared object in each of the final superimposed scenes based upon the predetermined specification and the shared scenes.

9. A method according to claim 8, further comprising: receiving information specifying an order of superposition of the individual graphical user interface screens of the two or more shared scenes; and wherein the control information controls an order of superposition of the shared objects based upon the order of superposition of the individual graphical user interface screens of the two or more shared scenes.

10. A receiving method according to claim 7, wherein the predetermined specification comprises a data broadcasting specification.

* * * * *